United States Patent [19]

Bespalko

[11] Patent Number: 5,224,038
[45] Date of Patent: Jun. 29, 1993

[54] TOKEN EDITOR ARCHITECTURE

[75] Inventor: Stephen J. Bespalko, Escondido, Calif.

[73] Assignee: Xerox Corporation, Stamford, Conn.

[21] Appl. No.: 333,229

[22] Filed: Apr. 5, 1989

[51] Int. Cl.$^5$ ............................................. G06F 15/38
[52] U.S. Cl. ................................................... 364/419
[58] Field of Search .............. 364/419, 900 MS File, 364/200 MS File; 400/4, 73

[56] References Cited

U.S. PATENT DOCUMENTS

| | | | |
|---|---|---|---|
| 4,028,677 | 6/1977 | Rosenbaum | 340/172.5 |
| 4,092,729 | 5/1978 | Rosenbaum et al. | 364/900 |
| 4,181,972 | 1/1980 | Casey | 364/900 |
| 4,481,577 | 11/1984 | Forson | 364/200 |
| 4,500,955 | 2/1985 | Chang | 364/200 |
| 4,678,351 | 7/1987 | Curley | 364/900 |

OTHER PUBLICATIONS

Lexicontext, A Dictionary-Based Text Processing System by John Francis Haverty, Oct. 26, 1971.
Copilot: A Multiple Process Approach to Interactive Programming Systems by Daniel Carl Swinehart, Jul. 1974.

*Primary Examiner*—Roy N. Envall, Jr.
*Assistant Examiner*—Xuong Chung
*Attorney, Agent, or Firm*—Robert E. Cunha

[57] ABSTRACT

A method of representing the text in a document in a way that enables very fast text processing on digital computers. More specifically, each word of text is represented as a number (or token) that refers to an information packet describing the word's characteristics. Operations then process each token, rather than each character, to perform text processing functions. In addition to the compact nature of this representation, the performance of virtually all functions in a WYSIWYG editor are improved. In particular, determining line breaks and displaying text are significantly faster when the text is processed a token at a time rather than a character at a time.

25 Claims, 24 Drawing Sheets

```
DIRECTORY
   TokenProps    USING [Offset];

EntryType;     TYPE = MACHINE DEPENDENT {token(0), escape(1)};
EscapeType;    TYPE = MACHINE DEPENDENT {space(0), zeroWidthSpace(1), changeBase(2)};

Thirteen Bits:   TYPE = [0..8191];

Entry: TYPE = MACHINE DEPENDENT RECORD [
   SELECT entryType: EntryType FROM
      token = >
         [spaceFollows: BOOLEAN,
          offset:   TokenProps. Offset],
      escape = >
         [SELECT escapeType: EscapeType FROM
             changeBase = >     [newBase: ThirteenBits],
             space = >          [],
             zeroWidthSpace = > [],
             ENDCASE],
      ENDCASE];

EncodedText:   TYPE = LONG DESCRIPTOR FOR ARRAY CARDINAL OF Entry;

END.
```

FIG. 1

```
[escape    [cgabgeBase [newBase: 1]]],
[token     [spaceFollows:TRUE,     offset:       1] ],    The□
[token     [spaceFollows:TRUE,     offset:      20] ],    approach□
[token     [spaceFollows:TRUE,     offset:      44] ],    used□
[token     [spaceFollows:TRUE,     offset:      63] ],    here□
[token     [spaceFollows:TRUE,     offset:      82] ],    is□
[token     [spaceFollows:TRUE,     offset:     101] ],    to□
[token     [spaceFollows:TRUE,     offset:     120] ],    encode□
[token     [spaceFollows:TRUE,     offset:     141] ],    the□
[token     [spaceFollows:TRUE,     offset:     160] ],    entire□
[token     [spaceFollows:TRUE,     offset:     184] ],    document□
[token     [spaceFollows:TRUE,     offset:     211] ],    as□
[token     [spaceFollows:TRUE,     offset:     230] ],    a□
[token     [spaceFollows:TRUE,     offset:     256] ],    sequence□
[token     [spaceFollows:TRUE,     offset:     280] ],    of□
[token     [spaceFollows:TRUE,     offset:     299] ],    tokens□
[token     [spaceFollows:FALSE,    offset:     323] ],    (
[token     [spaceFollows:TRUE,     offset:     342] ],    or□
[token     [spaceFollows:FALSE,    offset:     361] ],    numbers
[token     [spaceFollows:TRUE,     offset:     385] ],    )□
[token     [spaceFollows:TRUE,     offset:     404] ],    where□
[token     [spaceFollows:TRUE,     offset:     425] ],    each□
[token     [spaceFollows:TRUE,     offset:     444] ],    unique□
[token     [spaceFollows:TRUE,     offset:     465] ],    punctuation□
[token     [spaceFollows:FALSE,    offset:     512] ],    mark
[token     [spaceFollows:TRUE,     offset:     531] ],    ,□
[token     [spaceFollows:FALSE,    offset:     550] ],    space
[token     [spaceFollows:TRUE,     offset:     531] ],    ,□
[token     [spaceFollows:TRUE,     offset:     342] ],    or□
[token     [spaceFollows:TRUE,     offset:     256] ],    sequence□
[token     [spaceFollows:TRUE,     offset:     280] ],    of□
[token     [spaceFollows:TRUE,     offset:     571] ],    contiguous□
[token     [spaceFollows:TRUE,     offset:     600] ],    characters□
[token     [spaceFollows:TRUE,     offset:     629] ],    separated□
[token     [spaceFollows:TRUE,     offset:     661] ],    by□
[token     [spaceFollows:TRUE,     offset:     230] ],    a□
[token     [spaceFollows:TRUE,     offset:     550] ],    space□
[token     [spaceFollows:TRUE,     offset:     342] ],    or□
[token     [spaceFollows:TRUE,     offset:     465] ],    punctuation□
[token     [spaceFollows:TRUE,     offset:     512] ],    mark□
[token     [spaceFollows:TRUE,     offset:      82] ],    is□
```

*FIG. 2A*

| | | | | |
|---|---|---|---|---|
| [token | [spaceFollows:TRUE, | offset: | 680] ], | identified |
| [token | [spaceFollows:TRUE, | offset: | 709] ], | with |
| [token | [spaceFollows:TRUE, | offset: | 230] ], | a |
| [token | [spaceFollows:TRUE, | offset: | 444] ], | unique |
| [token | [spaceFollows:FALSE, | offset: | 728] ], | token |
| [token | [spaceFollows:TRUE, | offset: | 768] ], | . |
| [token | [spaceFollows:TRUE, | offset: | 787] ], | During |
| [token | [spaceFollows:TRUE, | offset: | 811] ], | an |
| [token | [spaceFollows:TRUE, | offset: | 830] ], | editing |
| [token | [spaceFollows:TRUE, | offset: | 854] ], | session |
| [token | [spaceFollows:TRUE, | offset: | 230] ], | a |
| [token | [spaceFollows:TRUE, | offset: | 878] ], | table |
| [token | [spaceFollows:TRUE, | offset: | 82] ], | is |
| [token | [spaceFollows:TRUE, | offset: | 902] ], | constructed |
| [token | [spaceFollows:TRUE, | offset: | 709] ], | with |
| [token | [spaceFollows:TRUE, | offset: | 230] ], | a |
| [token | [spaceFollows:TRUE, | offset: | 931] ], | set |
| [token | [spaceFollows:TRUE, | offset: | 280] ], | of |
| [token | [spaceFollows:TRUE, | offset: | 950] ], | properties |
| [token | [spaceFollows:TRUE, | offset: | 979] ], | for |
| [token | [spaceFollows:TRUE, | offset: | 425] ], | each |
| [token | [spaceFollows:FALSE, | offset: | 728] ], | token |
| [token | [spaceFollows:TRUE, | offset: | 768] ], | . |
| [token | [spaceFollows:TRUE, | offset: | 998] ], | token |
| [token | [spaceFollows:TRUE, | offset: | 950] ], | properties |
| [token | [spaceFollows:FALSE, | offset: | 1024] ], | include |
| [token | [spaceFollows:TRUE, | offset: | 141] ], | the |
| [token | [spaceFollows:TRUE, | offset: | 1048] ], | last |
| [token | [spaceFollows:TRUE, | offset: | 1067] ], | font |
| [token | [spaceFollows:TRUE, | offset: | 141] ], | the |
| [token | [spaceFollows:TRUE, | offset: | 728] ], | token |
| [token | [spaceFollows:TRUE, | offset: | 1086] ], | was |
| [token | [spaceFollows:FALSE, | offset: | 1105] ], | encountered |
| [token | [spaceFollows:TRUE, | offset: | 531] ], | , |
| [token | [spaceFollows:TRUE, | offset: | 141] ], | the |
| [token | [spaceFollows:TRUE, | offset: | 1134] ], | type |
| [token | [spaceFollows:TRUE, | offset: | 280] ], | of |
| [token | [spaceFollows:FALSE, | offset: | 728] ], | token |
| [token | [spaceFollows:TRUE, | offset: | 531] ], | , |
| [token | [spaceFollows:TRUE, | offset: | 1153] ], | as |

FIG. 2B

| | | | |
|---|---|---|---|
| [token | [spaceFollows:TRUE, | offset: 1172]], | well☐ |
| [token | [spaceFollows:TRUE, | offset: 1153]], | as☐ |
| [token | [spaceFollows:TRUE, | offset: 1191]], | metric☐ |
| [token | [spaceFollows:TRUE, | offset: 1215]], | information☐ |
| [token | [spaceFollows:TRUE, | offset: 979]], | for☐ |
| [token | [spaceFollows:TRUE, | offset: 141]], | the☐ |
| [token | [spaceFollows:TRUE, | offset: 160]], | entire☐ |
| [token | [spaceFollows:TRUE, | offset: 1247]], | word☐ |
| [token | [spaceFollows:TRUE, | offset: 1280]], | and☐ |
| [token | [spaceFollows:TRUE, | offset: 425]], | each☐ |
| [token | [spaceFollows:TRUE, | offset: 1299]], | hyphenation☐ |
| [token | [spaceFollows:FALSE, | offset: 1328]], | point |
| [token | [spaceFollows:TRUE, | offset: 768]], | .☐ |
| [escape | [space[]]], | | ☐ |
| [token | [spaceFollows:TRUE, | offset: 1368]], | demonstrate☐ |
| [escape | [space[]]], | | ☐ |
| [token | [spaceFollows:TRUE, | offset: 141]], | the☐ |
| [escape | [space[]]], | | ☐ |
| [token | [spaceFollows:TRUE, | offset: 1397]], | use☐ |
| [escape | [space[]]], | | ☐ |
| [token | [spaceFollows:TRUE, | offset: 280]], | of☐ |
| [escape | [space[]]], | | ☐ |
| [token | [spaceFollows:TRUE, | offset: 1416]], | escape☐ |
| [escape | [space[]]], | | ☐ |
| [token | [spaceFollows:TRUE, | offset: 1440]], | entries☐ |
| [escape | [space[]]], | | ☐ |
| [token | [spaceFollows:TRUE, | offset: 425]], | each☐ |
| [escape | [space[]]], | | ☐ |
| [token | [spaceFollows:TRUE, | offset: 280]], | of☐ |
| [escape | [space[]]], | | ☐ |
| [token | [spaceFollows:TRUE, | offset: 141]], | the☐ |
| [escape | [space[]]], | | ☐ |
| [token | [spaceFollows:TRUE, | offset: 1464]], | words☐ |
| [escape | [space[]]], | | ☐ |
| [token | [spaceFollows:TRUE, | offset: 1485]], | in☐ |
| [escape | [space[]]], | | ☐ |
| [token | [spaceFollows:TRUE, | offset: 1504]], | this☐ |
| [escape | [space[]]], | | ☐ |
| [token | [spaceFollows:TRUE, | offset: 1536]], | sentence☐ |
| [escape | [space[]]], | | ☐ |

*FIG. 2C*

| | | | | |
|---|---|---|---|---|
| [token | [spaceFollows:TRUE, | offset: | 1560] ], | will☐ . |
| [escape | [space [ ] ] ], | | | ☐ |
| [token | [spaceFollows:TRUE, | offset: | 1579] ], | be☐ |
| [escape | [space [ ] ] ], | | | ☐ |
| [token | [spaceFollows:TRUE, | offset: | 629] ], | separated☐ |
| [escape | [space [ ] ] ], | | | ☐ |
| [token | [spaceFollows:TRUE, | offset: | 1661] ], | by☐ |
| [escape | [space [ ] ] ], | | | ☐ |
| [token | [spaceFollows:TRUE, | offset: | 1598] ], | two☐ |
| [escape | [space [ ] ] ], | | | ☐ |
| [token | [spaceFollows:FALSE, | offset: | 1617] ], | spaces |
| [token | [spaceFollows:TRUE, | offset: | 768] ], | |

FIG. 2D

```
DIRECTORY Environment

TokenProps: DEFINITIONS = BEGIN

BreakType:          TYPE = MACHINE DEPENDENT
   {hard(0), discretionary(1), best(2), better(3), good(4), ok(5),
   specialGermanCase(255)};

lastPropsOffset:    PRIVATE CARDINAL = 16384;

Base:               TYPE = LONG VASE POINTER TO Object;
Offset:             TYPE = Base RELATIVE POINTER [0..lastPropsOffset)
                        TO Object;
Handle:             TYPE = LONG POINTER TO OBJECT;
Trailer Handle:     TYPE = LONG POINTER TO OBJECT Trailer;

maxPages:           CARCINAL = lastPropsOffse / Environment.wordsPerPage;

Object:             TYPE = MACHINE DEPENDENT RECORD [
   notPunctuation (0:0..0):  BOOLEAN,
   font (0: 1..15):          FontATOM,
   atomMetrics (1):          AtomMetrics,
   breakPointCount (4):      CARDINAL,
   breakPoint (5):           SEQUENCE COMPUTED CARDINAL OF
                                BreakPointData];

ObjectTrailer:      TYPE = MACHINE DEPENDENT RECORD [
   referenceCount:  CARDINAL,
   text:            PACKED SEQUENCE COMPUTED CARDINAL OF
                        ENVIRONMENT.Byte]:

AtomMetrics:        TYPE = MACHINE DEPENDENT RECORD [
   micaLength (0):   NATRUAL,
   pixelLength (1):  NATRUAL,
   byteLength (2):   NATRUAL]:

BreakPointData:     TYPE = MACHINE DEPENDENT RECORD [
   type (0:0..7):          BreakType,
   byteCount (0:8..15):    Environment.Byte,
   micaLength (1):         NATURAL,
   pixelLength (2):        NATURAL], FontATOM:           TYPE = NATURAL;

END
```

FIG. 3

The approach used here is to encode the entire document as a sequence of tokens (or numbers) where each unique punctuation mark, space, or sequence of contiguous caharacters seperated by a space or punctuation mark is identified wiht a unique token. During an edition session a table is constructed with a set of properties for each token. Token properties include the last font the token was encountered, the type of token, as well as metric information for the eitire word and each hyphenation point. To demonstrate the use of escape entries each of the words in this setence will be separated by two spaces.

FIG. 4

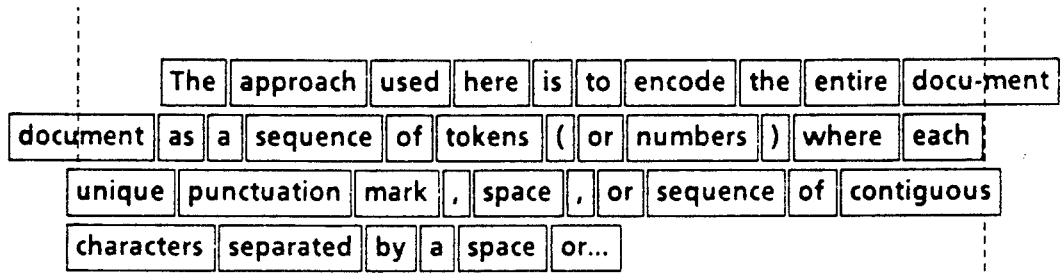

*FIG. 8*

```
DIRECTORY
    Environment         USING [Byte],
    ESCAlphaExrtas      USING [aLINEBREAK],
    Inline              USING [DBITAND],
    Mopcodes            USING [zESC],
    Token               USING [Encoded Text],
    TokenProps          USING [Base, FontATOM];

LineBreak:  DEFINITIONS
            IMPORTS Inline = BEGIN

SuffixChar:   TYPE = MACHINE DEPENDENT {space(0), zeroWidthSpace(1),
              hyphen(2), hardHyphen(3), null(4)};
Reason:       TYPE = MACHINE DEPENDENT
              {margin(0), normal(1), changeBase(2), invalidProps(3),
              contiguousWords(4), unableToBreak(5), specialGermanCase(6)};

TwelveBits:   TYPE = [0..4095]:

ArgRec:  TYPE = MACHINE DEPENDENT RECORD [
    text (0):                        Token.EncodedText,
    propsBase (3):                   TokenProps.Base,
    hyphenate (5:0..0):              BOOLEAN,
    font (5:1..15):                  TokenProps.FontATOM,
    margin (6):                      NATURAL,
    hyphenPixelLength (7:0..7):      Environment.Byte,
    minSpacePixelLength (7:8..15):   Environment.Byte,
    hyphenMicaLength (8):            NATURAL,
    minSpaceMicaLength (9):          NATURAL,
    whiteSpace (10):                 NATURAL,
    final(11):                       State,
    prior(17):                       State]:

ArgHandle: TYPE = LONG POINTER TO ArgRec:
ArgSpace: TYPE = ARRAY [1..SIZE[ArgRec] + argAlignment) OF UNSPECIFIED;
argAlignment: PRIVATE CARDINAL = 32;
```

*FIG. 9A*

```
State: TYPE = MACHINE DEPENDENT RECORD
        [indes (0):                CARDINAL,
         micaLength (1):           INTEGER,
         pixelLength (2):          INTEGER,
         count (3:0..11):          TwelveBits,
         nonPunctuation (3:12..12): BOOLEAN,
         suffixChar (3: 13..15):   SuffixChar,
         byteCount (4):            INTEGER,
         whiteSpace (5):           NATURAL, AlignArgRec: PROCEDURE [lp: LONG POINTER TO ArgSpace]
       RETURNS  [ArgHandle] = INLINE
    {RETURN [Inline.DBITAND [lp + argAlignment-1, 0FFFFFFFE0H]]};

SoftwareLineBreak: PROCEDURE [arg:  Arghandle]
         RETURNS    [reason: Reason];

LineBreak: PROCEDURE [arg:  Arghandle]
      RETURNS  [reason: Reason] = MACHINE CODE
   {Mopcodes.zESC, ESCAlhpaExtras.aLINEBREAK};

END.
```

*FIG. 9B*

```
DIRECTORY
   ESCAlphaExtras,
   Frame,
   LineBreak,
   PrincOps,
   TokenProps;

LineBreakImpl:    PROGRAM
                  IMPORTS Frame
                  EXPORTS LineBreak = BEGIN nullData: LineBreak.State = [0,0,0,0,FALSE, null,0,0];

SoftwareLineBreak: PUBLIC PROCEDURE [arg. LineBreak.ArgHandle]
              RETURNS [reason: LineBreak.Reason] = BEGIN props:            TokenProps.Handle;
      trailer:          TokenProps.TrailerHandle;
      margin:           NATURAL = arg.margin;
      thisBreak, pending: LONG POINTER TO
                        TokenProps.BreakPointData←NIL;
      width:            CARDINAL;
      BreakNum:         CARDINAL←0;
      fit:              NATURAL←0;
      minWidth:         NATURAL;
      final, prior:     LONG POINTER TO LineBreak.State;
      aM:               TokenProps.AtomMetrics;

WholeWordBreak: PROCEDURE = INLINE {final↑ ←nullData;
final.index←prior.index + 1};
SaveThisBreak: PROCEDURE = INLINE {final.notPunctuation←FALSE;
prior↑ ←final↑ };
```

*FIG. 10A*

```
EXITS
   successExit = >
      --add the sylable to the current position and make it the break point
      {final.micaLength←width;
      final.pixelLength←final.pixelLength + thisBreak.pixelLength;
      final.byteCount←final.byteCount + thisBreak.byteCount;
      SaveThisBreak[];

--now compute the backup to start the next line
      final ↑ ← (IF final.suffixChar = hardHyphen THEN
            [index:           final.index,
            micaLength:       -thisBreak.micaLength,
            pixelLength:      -thisBreak.pixelLength,
            count:            0,
            notPunctuation:   FALSE,
            suffixChar:       null,
            byteCount:        -thisBreak.micaLength,
            whiteCount:       0] ELSE
            [index:           final.index,
            micaLength:       - (thisBreak.micaLength -
                                arg.hyphenMicaLength),
            pixelLength:      - (thisBreak.pixelLength -
                                arg.hyphenPixelLength),
            count:            0,
            notPunctuation:   FALSE,
            suffixChar:       null,
            byteCount:        - thisBreak.byteCount,
            whiteSpace:       0])};

noneFitsExit = >           WholeWordBreak[];
   unableToBreakExit = >      reason←unableToBreak;
   specialGermanExit = >      reason←GermanCase;
END
```

FIG. 10B

```
--MAIN LOOP OF LienBreak final ← @arg.final; prior ← @arg.prior;

UNTIL final.index > = arg.text.LENGTH DO
   WITH x: arg.text[final.index] SELECT FROM
      TOKEN = >
         {AM←(props← @arg.propsBase[x.offset]).atomMetrics;

IF props.font # arg.font THEN GOTO invalidPropsExit;
         IF margin < = (width←final.micaLength + aM.micaLength) THEN
         GOTO marginExit;
         IF final.notPunctuation AND props.notPunctuation THEN GOTO
         contiguousExit;

final.notPunctuation←props.notPunctuation;
         final.nucaLength←width;
         final.pixelLength←inal.pixelLength + aM.pixelLength;
         final.byteCount←final.byteCount + aM.byteCount;

IF x.spaceFollows THEN IF ProcessSpace [] THEN GO TO
         simpleMarginExit[]};

escape = >
         SELECT x.escapeType FROM
            space = >   IF ProcessSpace [] THEN GO TO simpleMarginExit};
            zeroWidthSpace = > {final.suffixChar←zeroWidthSpace;
            SaveThisBreak[]};
            changeBase = >  GO TO changeVaseExit;
      ENDCASE;

final.index←final.index + 1;
   REPEAT
      simpleMarginExit = > {reason←margin; WholeWordBreak[]};
      changeBaseExit = > reason←changeBase;
      invalidPropsExit = > reason←invalidProps;
      marginExit = >   {reason←margin; HyphenateWord[]};
      contiguousExit = > reason←contiguousWords;
      FINISHED = >    reason←normal;
   ENDLOOP;
END;
```

FIG. 10C

```
ProcessSpace: PROCEDURE RETURNS BOOLEANJ = INLINE BEGIN
   inal.suffixChar ←space;
   SaveThisBreak [];
   width ←final.micaLength + arg.minSpaceMicaLength;
   IF width > margin THEN RETURN(TRUE];
   final ↑←[index: final.index,
        micaLength: width,
        pixelLength: final.pixel Length + arg.minSpacePixelLength,
        ccount:   final.count + 1,
        notPunctuation: FALSE,
        suffixChar: space,
        byteCount: final.byteCount + I,
        whiteSpace: final.whiteSpace + arg.whiteSpace];
   RETURN [FALSE];
END;

HyphenateWord: PROCEDURE = INLINE BEGIN
   IF final.notpunctuation THEN GOTO unableToBreakExit;
   IF props.breakpointCount = 0 OR NOT arg.hyphenate THEN GO TO
   noneFitsExit;

--ifthe last full atom fits in the white space then don't hyphenate
   IF (margin - prior.whiteSpace) < = prior.micaLength THEN
    GO TO noneFitsExit;

--pick the hyphenation point with highest desirability that fits in the
   --white space, otherwise pick the one with the tightest fit
   thisBreak ← @props.breakPoint[0];
   minWidth ← margin - final.whiteSpace;
   DO
      I thisBreak.type = specialGermanCase THEN GOTO specialGermanExit;
      IF (width ← final.micaLength + thisBreak.micaLength) < = margin
      THEN
        {final.suffixChar ← hardHyphen; GOTO successExit};
      IF width > fit THEN {fit ←width; pending ←thisBreak}};
   IF (breakNum ←breakNum + 1) = props.breakpointCount THEN
      {IF fit = 0 THEN GOTO noneFitsExit;
      this8reak ← pending;
      width ← fit;
      final.suflixChar ¯← hyphen;
      GOTO successExit};
   thisBreak ← thisBreak + SIZE[TokenProps.BreakPointData];
ENDLOOP;
```

*FIG. 10D*

```
/* MESA TO C TYPE EQUIVALENCES     */
typedef unsigned short int CARDINAL;
typedef unsigned short int UNSPECIFIED;
typedef unsigned long int LCARDINAL;
typedef short int            INTEGER;
typedef long  int            LINTEGER;

typedef char                 CHARACTER;

#define NATURAL(__N)         unsigned int __N : 15
#define BOOLEAN(__N)         unsigned int __N : 1
#define TRUE            1
define FALSE           0 define NIL             0
define NULL            0

/* TYPES USED IN WORDCACHE MESA MODULE*/ typedef unsigned char        BREAKTYPE;
define    BRK_HARD          0
#define    BRK_DISCRET       1
#define    BRK_BEST          2
#define    BRK_BETTER        3
#define    BRK_GOOD          4
#define    BRK_OK            5
define    BRK_GRMAN         255 define OFFSET(__N)          unsigned int __N :14 typedef struct
    {
    CARDINAL    micalength;
    CARDINAL    pixellength;
    CARDINAL    bytecount;
    }           ATOM_METRICS;
```

*FIG. 11A*

```
typedef struct
    {
    BREAKTYPE          type;
    uunsigned char     bytecount;
    CARDINAL           micalength;
    CARDINAL           pixellength;
    }                  BREAKPOINT;

typedef struct

BOOLEAN (          notpunctuation );
    NATURAL (          font );
    WORD_METRICS       wordmettics;
    CARDINAL           sylablecount;
    SYLABLE            sylable[];
    }                  OBJECT;

/* TYPES USED IN LINEBREAK MESA MODULE */
typedef int REASON;
#define    REA_MARGIN 0
#define    REA_NORMAL 1
#define    REA_CHANGEBASE   2
#define    REA_INVALCACHE   3
#define    REA_CONTNORDS    4
#define    REA_CANTBREAK    5
define    REA_GERMAN 6 define    ENTRYTYPE(_N)   unsigned int _N:1
define    ENT_WORD 0
define    ENT_ESCAPE 1 define    ESCAPETYPE(_N)  unsigned int _N:2
define    ESC_SPACE 0
#define    ESC_ZERNIDSPACE   1
define    ESC_CHANGEBASE 2 define    SUFFIXCHAR(_N)  unsigned int _N:3
define    SUF_SPACE 0
#define    SUF_ZERWIDSPACE   1
#define    SUF_HYPHEN: 2
#define    SUF_HARDHYPHEN 3
#define    SUF_NULL 4
```

*FIG. 11B*

```
typedef unions
    {
    struct
        {
        ENTRYTYPE(      entrytype );
        BOOLEAN (       spacefollows );
        OFFSET (        offset );
        } token;
    struct
        {
        ENTRYTYPE (     entrytype );
        ESCAPETYPE (    type );
        unsigned int newbase :13;
        }escape;
    }           ENTRY;

typedef struct
    {ENTRY *    base;
    CARDINAL    length;
    }           ENTRYDSC;

typedef struct
    {
    CARDINAL  index;
    INTEGER   micalength;
    INTEGER   pixellength;
    unsigned int count : 12;
    BOOLEAN ( notpunctuation );
    SUFFIXCHAR (    suffixchar );
    INTEGER   bytecount;
    CARDINAL  whitespace;
    }           STATE;

typedef struct
    ENTRYDSC        text;
    unsigned char * cache;
    BOOLEAN (       hyphenate );
    NATURAL (       font );
    CARDINAL        margin;
    unsigned char   hyphenpixellength;
    unsigned char   minspacepixellength;
    CARDINAL        hyphenmicalength;
    CARDINAL        minspacemicalength;
    CARDINAL        whitespace;
    STATE           final;
    STATE           prior;
    }           ARGREC;
```

FIG. 11C

```
/* LINEBREAKIMPL - THIS ROUTINE IMPLEMENTS LINEBREAXIMPL.MESA IN C */ define WHOLEWORDBREAK                              \
       { final->index = prior->index + 1;               \
         final->micalength = 0;                         \
         final->pixellength = 0:                        \
         final->count :       0;                        \
         final->notpunctuation = FALSE;                 \
         final->bytecount =   0;                        \
         final->whitespace = 0; }                       \ define SAVETHISBREAK
       { final->notpunctrnation : FALSE;                \
         **prior = *final; } define PROCESSSPACE(_B)                                        \
       { final->suffixchar = SUF_SPACE;                             \
         SAVETHISBREAK;                                             \
         width a final->micalength + arg>minspacemicalength;        \
         if ( width > margin )                                      \
            (_B) = TRUE;                                            \
         else                                                       \
            { final->micalength =   width;                          \
              final->pixellength + = arg>minspacepixellength;       \
              final->count + =   1;                                 \
              final->notpunctuation = FALSE;                        \
              final->bytecount + =   1;                             \
              final->whitespace + = arg->whitespace;                \
              (_B) = FALSE; } }
```

FIG. 11D

```
REASON LINEBREAEIMPL ( arg )
register ARGREC * arg;
{OBJECT *          word;
CARDINAL           margin = arg ->margin;
SYLABLE *          thisbreakpoint = NULL;
SYLABLE *          pending = NULL;
CARDINAL           width;
CARDINAL           breaknum = 0;
CARDINAL           fit = 0;
CARDINAL           minwidth;
STATE *            final = &arg->final;
STATE *            prior : &arg->prior;
ATOM_METRICS       * am;
ENTRY *            x = &(arg ->text.base[final->index]);
CARDINAL           bool;

for ( ; final->index < arg->text.length ; final->index + +, x + + )
   {
   if( x->token.entrytype = = ENT_TOKEN )
      {
      props = (OBJECT *)(arg ->cache + x->token.offset);
      am = &props->atommetrics;

if( props->font ! = arg->font)
         return ( REA_INVALCACHE );

width = final ->micalength + am ->micalength;
      if ( margin < = width )
         {
         /* HYPHENATE WORD      */
         if ( final->notpunctuation )
            return ( REA_CANTBREAK );

if ( props->breakpointcount = = 0 II ! arg->hyphenate )
            {
            WHOLEWORDBREAK;
            return ( REA_MARGIN );
            }
   }
         /* IF THE LAST FULL WORD FITS IN THE WHITE -
            SPACE THEN DON'T HYPHENATE     */
         if( (margin - prior->whitespace) < : prior->micalength)
             {
             WHOLEWORDBREAK;
             return ( REA_MARGIN );
             }
```

FIG. 11E

```
        /* PACK THE BREAK POINT WITH THE HIGHEST
           DESIRABILITY THAT FITS IN THE WHITE SPACE,
           OTHERWISE PICK THE ONE WITH THE TIGHTEST
           FIT              */
minwidth = margin - final->whitespace;
for ( thisbreakpoint = &(props->breakpoint[0]) ;; thisbreakpoint + +
)
    {
    if ( thisbreakpoint->type = = BRK_GERMAN )
        return( REA_GERMAN );

if( (width:final>micalength + thisbreakpoint->micalength < = margin)
        {
        if ( thisbreakpoint->type := BRK_HARD )
            {
            final->suffixchar = SUF_HARDHYPHEN;
            break;
            } if ( width > = minwidth )
            {
            final->suffixchar = SUF_HYPHEN;
            break;
            } if ( width > fit )
            {
            fit = width;
            pending = thisbreakpoint;
            }
        }
    if ( + +breaknum = = props->breakpointcount )
        {
        if ( fit = = 0 )
            {
            WHOLEWORDBREAK;
            return( REA_MARGIN );
            } thisbreakpoint = pending;
        width = fit;
        final->suffixchar = SUF_HYPHEN;
        break;
        }
    }
```

FIG. 11F

```
/* ADD THE BREAKPOINT TO THE CURRENT POSITION AND MAKE IT THE
   BREAK POINT A  /*
final->micalength = width;
final->pixellength + = thisbreakpoint->pixellength;
final->bytecount +3 thisbreakpoint->bytecount;
SAVETHISBREAK;

/* NOW COMPUTE THE BACKUP TO START THE NEXT LINE  */
if ( final->suffixchar = = SUF_HARDHYPHEN )
    {
    final->micalength = (-thisbreakpoint>micalength);
    final->pixellength = (-thisbreakpoint>pixellength);
    }
else
    {
    final->micalength =
        (-( thisbreakpoint->micalength-arg->hyphenmicalength));
    final->pixellength :
        ((thisbreakpoint->pixellength-arg->hyphenpixellength));
    } final->count = 0;
final->notpunctuation = FALSE;
final->suffixchar = SUF_NULL;
final->bytecount = (thisbreakpoint->bytecount);
final->whitespace : 0;

return( REA_MARGIN );
}
if( final->notpunctuation && props->notpunctuation )
    return ( REA_CONTWORDS );

final->notpunctuation    = props->notpunctuation;
final->micalength        = width;
fnal->pixellength        + = am->pixellength;
final-=>bytecount        + = am->bytecount;
```

*FIG. 11G*

```
            if ( X->token . spacefollows )
               {
               PROCESSSPACE( bool );
               if ( bool )
                  {
                  WHOLEWORDBREAK;
                  return ( REA_MARGIN );
                  }
               }
         }
      else
      if ( x->token.entrytype = = EMT_ESCAPE )
         {
         if( x->escape.type = = ESC_SPACE )
            {
            PROCESSSPACE ( bool );
            if ( bool )
               {
               WHOLEWORDBREAK;
               return ( REA_MARGIN );
               }
            } if ( x->escape.type = = ESC_CHANGEBASE )
            return[ REA_CHANGEBASE );

if ( x->escape.type = = ESC_ZERWIDSPACE )
            {
            final->suffixchar = SUF_ZERWIDSPACE;
            SAVETHISBREAK;
            }
         }
      } return ( REA_NORAML );
};
```

*FIG. 11H*

```
arg = [text:DESCRIPTOR[11570000B ↑ ,134] (134)[...],
       propsBase;11421400B ↑ , hyphenate:TRUE, font:0, margin:8996,
       hyphenPixelLength:3, minSpacePixelLength:2,
       hyphenflicaLength:11B,
       minSpaceMicaLength:128, whiteSpace:128,
       final:[index:0, micaLength:0, pixelLength:0, count:0,
             notPunctuation:FALSE, suffixChar:null,
             byteCount:0, whiteSpace:0],
       prior:[index:0, micaLength:0, pixelLength:0, count:0,
             notPunctuation:FALSE, suffixChar:null, byteCount:0,
             whiteSpace:0]]

arg = [text:DESCRIPTOR [11570000B ↑ ,134) (134)[...],
       propsBase:11421400B ↑ , hyphenate:TRUE, font:0, margin:8996,
       hyphenPixelLength:3, minSpacePixelLength:2,
       hyphenflicaLength:11B,
       minSpaceMicaLength:128, whiteSpace:128,
       final:[index:0, micaLength:745, pixelLength:-21, count:0,
             notPunctuation:FALSE, suffixChar:null, byteCount:-4,
             whiteSpace:0],
       prior: [index:10, micaLength:8796, pixelLength:233, count:9,
             notPunctuation:FALSE, SuffixChar:hyphen, byteCount:51,
             whiteSpace:1152]]

arg = [text:DESCRIPTOR [11570000B ↑ ,134] (134)[...],
       propsBase:11421400B ↑ , hyphenate:TRUE, font:0, margin:9878,
       hyphenPixelLength:3, minSpacePixelLength:2,
       hyphentticaLength:11B,
       minSpacetticaLength:128, whiteSpace:128,
       final: [index:22, micaLength:0, pixelLength:0, count:0,
             notPunctuation:FALSE, suffixChar:null, byteCount:0,
             whiteSpace:0],
       prior: [index:21, micaLength:9425, pixelLength:249, count:9,
             notPunctuation:FALSE, suffixChar:space, byteCount:54,
             whiteSpace:1152]]

arg = [text:DESCRIPTOR [11570000B ↑ ,134] (134)1...],
       propsBase:11421400B ↑ , hyphenate:TRUE, font:0, margin:9878,
       hyphenPixelLength:3, minSpacePixelLength:2,
       hyphenMicaLength:118,
       minSpaceLength:128, whiteSpace:128,
       final : [index:32, micaLength:0, pixelLength:0, count:0,
             notPunctuation;FALSE, suffIxChar:null, byteCount:0,
             whiteSpace:0],
       prior;[index:31, micalength:9838, pixelLength:265, count:7,
             notPunctuation:FALSE, suffixChar:space, byteCount:57,
             whiteSpace:896]]
```

*FIG. 12*

The approach used here is to encode the entire document as a sequence of tokens (or numbers) where each unique punctuation mark, space, or sequence of contiguous characters separated by a space or punctuation mark is identified with a unique token. During an editing session a table is constructed with a set of properties for each token. Token properties include the last font the token was encountered, the type of token, as well as metric information for the entire word and each hyphenation point. To demonstrate the use of escape entries each of the words in this sentence will be separated by two spaces.

*FIG. 13*

```
[escape    [cgabgeBase [newBase: 1]]],
[token     [spaceFollows:TRUE,    offset:       1]],    The☐
[token     [spaceFollows:TRUE,    offset:      20]],    approach☐
[token     [spaceFollows:TRUE,    offset:      44]],    used☐
[token     [spaceFollows:TRUE,    offset:      63]],    here☐
[token     [spaceFollows:TRUE,    offset:      82]],    is☐
[token     [spaceFollows:TRUE,    offset:     101]],    to☐
[token     [spaceFollows:TRUE,    offset:     120]],    encode☐
[token     [spaceFollows:TRUE,    offset:     141]],    the☐
                                     •
                                     •
                                     •
[token     [spaceFollows:TRUE,    offset:     230]],    a☐
[token     [spaceFollows:FALSE,   offset:     550]],    space
[token     [spaceFollows:TRUE,    offset:     342]],    or☐
[token     [spaceFollows:TRUE,    offset:     465]],    punctuation☐
[token     [spaceFollows:TRUE,    offset:     512]],    mark☐
[token     [spaceFollows:TRUE,    offset:      82]],    is☐
[token     [spaceFollows:TRUE,    offset:     680]],    identified☐
[token     [spaceFollows:TRUE,    offset:     709]],    with☐
[token     [spaceFollows:TRUE,    offset:     230]],    a☐
[token     [spaceFollows:TRUE,    offset:     444]],    unique☐
[escape    [changeBase [nerBase:2]]],
[token     [spaceFollows:FALSE,   offset:      22]],    toke
```

*FIG. 14*

```
[escape    [changeBase [newBase: 2]]],
[token     [spaceFollows:TRUE,    offset:      47] ],        n
[escape    [changeBase [newBase: 1]]],
[token     [spaceFollows:TRUE,    offset:     768] ],        □
[token     [spaceFollows:TRUE,    offset:     998] ],        Token□
[token     [spaceFollows:TRUE,    offset:     950] ],        properties□
[token     [spaceFollows:TRUE,    offset:    1024] ],        include□
[token     [spaceFollows:TRUE,    offset:     141] ],        the□
[token     [spaceFollows:TRUE,    offset:    1048] ],        last□

•
                                          •
                                          •

[token     [spaceFollows:TRUE,    offset:    1560] ],        will□
[escape    [space[]]],                                       □
[token     [spaceFollows:TRUE,    offset:    1579] ],        be□
[escape    [space[]]],                                       □
[token     [spaceFollows:TRUE,    offset:     629] ],        separated□
[escape    [space[]]],                                       □
[token     [spaceFollows:TRUE,    offset:     661] ],        by□
[escape    [space[]]],                                       □
[token     [spaceFollows:TRUE,    offset:    1598] ],        two□
[escape    [space[]]],                                       □
[token     [spaceFollows:FALSE,   offset:    1617] ],        spaces
[token     [spaceFollows:TRUE,    offset:     768] ]
```

*FIG. 15*

TOKEN EDITOR ARCHITECTURE

BACKGROUND OF THE INVENTION

In a typical word processing system each paragraph exists internally as one or more strings of characters, and must be broken into lines before it can be displayed or printed. For example, the typical line-breaking algorithm has a main inner loop which adds the width of the current character to the sum of the widths of previous characters, and compares the new total to the desired line width. The program will execute this loop until the number of characters in the line exceeds the number of characters that can be fit in the line. At this point, the program can either end the line with the last full word, or hyphenate the current word and put the word portion after the hyphen at the beginning of the next line.

Two problems with this process cause it to run too slowly: first, the inner loop must be executed for every character in the line; second, if hyphenation is enabled, the context of the character that overran the margin must be deduced—that is, a determination must be made whether the character is a space, punctuation mark, or part of a word. In general, all operations that require processing of each character such as pagination and scrolling through the document are very slow. In addition, operations that depend on the interpretation of the document as a sequence of words, such as hyphenation, spell-checking and search and replace are also very slow.

U.S. Pat. No. 4,181,972 (Casey) relates to a means and methods for automatic hyphenation of words and discloses a means responsive to the length of input words, rather than characters. However the Casey patent does not store the word length obtained for future use; at the time that hyphenation is requested, the Casey method scans the entire text character-by-character. The Casey patent also does not compute breakpoints based on the whole word length. Instead, Casey teaches the use of a memory-based table of valid breakpoints between consonant/vowel combinations.

U.S. Pat. Nos. 4,092,729 (Rosenbaum et al) and 4,028,677 (Rosenbaum) relate to methods of hyphenation also based on a memory table of breakpoints. Rosenbaum '729 accomplishes hyphenation based on word length (see claim 6), but the method disclosed is different than the invention disclosed here. In Rosenbaum '729, words are assembled from characters at the time hyphenation is requested, and then compared to a dictionary containing words with breakpoints. The invention disclosed here assembles the words at the time the document is encoded, and does not use a dictionary look-up technique while linebreaks are computed.

What is required is a better method of representing the text for document processing. A natural approach for reducing the computational intensity of the composition function would be to create data structures that would enable computation a word at a time rather than a character at a time. The internal representation of the text, in this case, is a token which is defined as the pair:

<type,data> where the type is a unique identifier for each class of token, and data is the data associated with a particular type of token. A token can be represented in a more compact way as <type,pointer> where the pointer is the address of the data associated with that token. This form of the token is more easily manipulated since entries are the same length. An even more compact representation of a token is achieved when the token type is included in the data block; this reduces the fundamental token object to a pointer. Since the type information is still present in the datablock, a pointer of this form is still appropriately referred to as a token. In the past, several approaches used an internal representation of text that was some form of token, and all had drawbacks that prevented them from being applied to rapid text composition.

Numerous prior systems have used tokens for editing computer programs. See, for example: Copilot: A Multiple Process Approach to Interactive Programming Systems, Daniel Carl, July 1974, phD Thesis, Stanford University. Swinehart uses tokens to maintain a relationship between the source code (text) and the corresponding parse tree that the compiler uses to translate the program into machine instructions. After each editing operation the lines of source code that changed are rescanned into tokens, the parse tree is rebuilt and finally, the parse tree is inspected for correctness. These systems are very popular for creating and modifying programs written in languages like Lisp, but tend to be fairly slow and laborious. The benefit to the user is that there is a greater likelihood that the changes made to a program will result in errors being removed rather than introduced.

A second known approach uses tokens as the fundamental text unit to represent English words rather than elements of a computer programming language. In Lexicontext: A Dictionary-Based Text Processing System, John Fransis Haverty, August 1971, masters thesis, Massachusetts Institute of Technology, a token points to a lexicon entry containing the text for the word; a hashing function is then used to retrieve the data associated with the entry which can be uniquely defined for each token. This encoding method is very general, but at the expense of performance.

Furthermore, since a principal application of Haverty's method is as a natural language interface to an operating system, the lexicon is global and thus independent of any particular document. This architecture is practical in an environment where the information is processed on a single central processor and when the entire universe of words that would be encountered is known in advance. Even if words could be added to the global lexicon, there would still be problems in a distributed environment where processors may not be connected to a network or other communications device. In this case, the lexicons would quickly diverge, and documents created on one machine could not be correctly interpreted on any other machine. Another major drawback of this approach is that if an error is detected in the main lexicon all of the documents encoded with the flawed lexicon would need to be reprocessed—if it was even possible to rebuild the documents. Because the main lexicon must by design be very large, it would be impractical to maintain the lexicon as resident in main memory. A large lexicon not resident in main memory would impose a tremendous performance penalty.

SUMMARY OF THE INVENTION

This invention is a method of using tokens to represent text in a way that is specifically designed for efficiently editing text, specifically when applied to WYSIWYG editors. Rather than the tree-oriented structure that is used in the computer program editors, a simple linked list is used. The tokens point directly to the data associated with the token thus eliminating the hashing function and, although the data blocks are of variable length, the data blocks are uniformly defined for all tokens. The dictionaries are local to each document, leading to a system that is well suited to distributed environments.

The technique could be applied to a document composition system to speed up line-breaking and other macroscopic document operations such as pagination, string search and replace, and spelling correction. This invention can also be used for improving the performance of interactive operations such as displaying typed-in characters, scrolling through the document, and resolving mouse clicks to a position in the document. The method is particularly efficient when hyphenated text is desired. Performance does not degrade when the algorithms are extended to support ligatures, kerned pairs and foreign text. This technique is extremely well suited to German text, which is more likely to contain long words, hyphenations, spelling changes which result from hyphenations, and words that must be hyphenated more than once.

The method consists of parsing the text in a document into a sequence of "atoms" which can be words, punctuation marks or spaces, and assigning a number (a "token") to each one. As an example, if the program assigns the token "301" to the atom "of" the first time that word is encountered, then it will continue to assign the same number "301" to every other "of" in the document.

A table of properties is also constructed for each unique token in the document. The following is a list of the properties maintained for atoms other than spaces:

| | |
|---|---|
| text: | the characters in the atom |
| lastFont: | a code representing the display characteristics of the font used to compute the token properties cached in this table |
| displayBitMap: | the bit map of the atom text in font lastFont |
| notPunctuation: | a Boolean indicating whether the atom is a punctuation mark |
| atomMetrics: | a record containing the character count of the token and the width of the word in screen and printer units. This information is derived from the font referred to by lastFont. |
| breakPoints: | An array with one entry for each break point in the token. If the entry is a hyphenation point, the entry contains metric information for the portion of the word prior to the hyphenation point, including the width of the hyphen. If the hyphen is a hard hyphenation point inserted by the user then the width of the hyphen is not included. |

The token corresponding to a space is handled differently from other tokens. It does not have a set of properties associated with it since the rules for treating it are much different from those of other tokens.

A text processing function can proceed by using each successive token to access the current token properties. This greatly speeds up the algorithms that classically process the document a character at a time, as well as the text functions that interpret the document as a sequence of atoms.

The line-breaking algorithm can use each successive token to access the metric information in the token properties. If the line width has been exceeded, the current line will usually be terminated at the previous token. If the text is to be right justified, the interword spacing can be stretched. Finally, if the line cannot be stretched far enough, the token corresponding to the overset token will be examined to determine if it can be hyphenated.

The token-by-token method not only leads to more efficient line breaking, but also speeds up other editing functions that depend on the document being interpreted as a series of atoms (e.g. words, spaces and punctuation marks). With spell-checking, for example, no matter how many times a word is used in a document, the spelling of that word need only be checked once, since the same token will be used for each instance of the word. The algorithm proceeds in two phases. First the algorithm checks all entries in the atom table. Then it scans the document for contiguous or fragmented words.

Inserting and deleting characters as well as entire tokens from text encoded with this method is very efficient. In the case of individual characters, a special token is employed that can be quickly modified. Inserting and deleting entire tokens is even faster than individual characters since the operations involve only modifying the string of tokens. Screen painting during type-in is very rapid, since all of the operations typically involved with updating the document data-structures, determining the new line-endings, and painting the text on the screen all benefit from this technique.

The search and replace function also benefits from having to process only the text in the atom table, if it is searching for one word. If it is searching for multiple words it need only scan the document for sequences of atoms, rather than sequences of characters.

This method of encoding text also leads to a very compact external format. It is possible to segregate the token properties into basic properties and derived properties that can be computed from the basic token properties (i.e. the characters in the token and the location of break-points). Only the basic token properties need to be written out on the file. When a new edit session is started with the file, the basic properties are used to add the derived properties.

BRIEF DESCRIPTION OF THE FIGURES

FIG. 1 is the source file defining the token data structure, written in the Mesa programming language;

FIGS. 2(a-d) is the encoding of the text in FIG. 4 using the data structure defined in FIG. 1;

FIG. 3 is the source file defining the data structures to represent token properties, written in the Mesa programming language;

FIG. 4 is a sample text passage used in the examples;

FIG. 8 is a diagram showing the order in which tokens are processed when hyphenation is enabled. The text is from FIG. 4.

FIGS. 9(a-b) is the source file for the definitions of the line-breaking algorithm that processes text encoded as tokens, written in the Mesa programming language;

FIGS. 10(a-d) is the source file for the implementation of the line-breaking algorithm for breaking lines of text encoded as tokens, written in the Mesa programming language;

FIGS. 11(a-h) is the equivalent of the Mesa source code in FIGS. 10(a-d) written in the C programming language.

FIG. 12 is the result of the algorithm defined in FIGS. 10(a-d) on the first three lines of the text in FIG. 4;

FIG. 13 is the text in FIG. 4, with a portion of the text highlighted to represent a selection;

FIG. 14 is the initial fragment of the encoded text in FIG. 2(a-d) that remains after the text selected in FIG. 13 is deleted; and FIG. 15 is the final fragment of the encoded text in FIG. 2(a-d) that remains after the text selected in FIG. 13 is deleted.

DETAILED DESCRIPTION OF THE INVENTION

Data Structures

Figure 5:
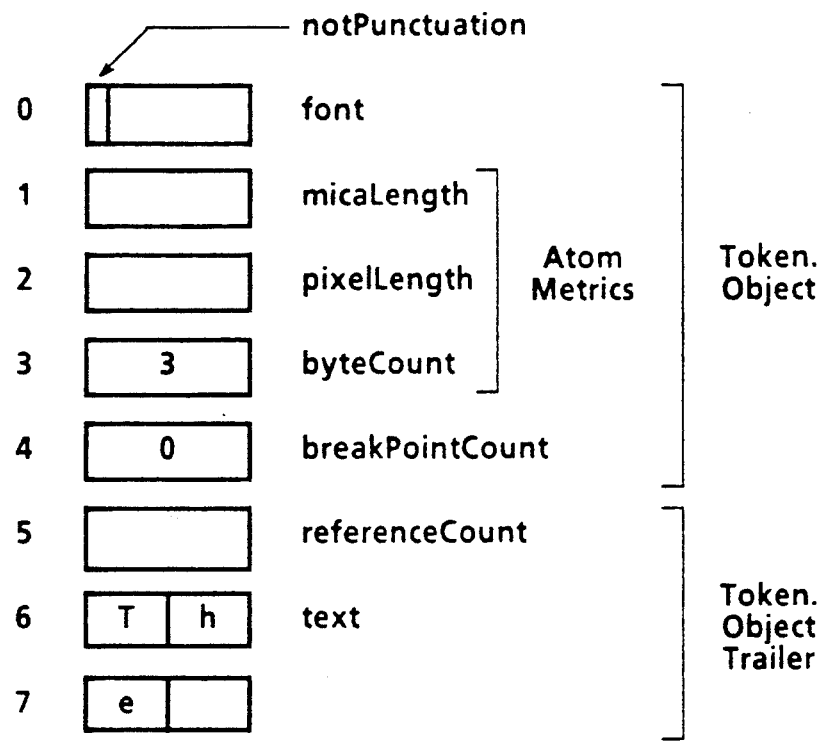
FIG. 5 is the memory layout for the token properties defined in FIG. 3 for a token that has no break points.

Encoding text using this method consists of parsing the document into atoms and building arrays of tokens that correspond to the atoms. A small number of entries in the arrays are not tokens. These are special entries that are required for encoding infrequent sequences of characters (like consecutive spaces) and for encoding very large documents.

The text in FIG. 1 consists of the type definitions for the data structures needed to encode text into tokens. The computer language used in FIG. 1 is Mesa [The Xerox Development Environment Mesa Language Manual, Xerox Corporation, 1985]. Mesa is similar to Pascal [Pascal User Manual and Report, Katheleen Jensen and Niklaus Wirth, Springer-Verlag, 1974] and Modula II [Programming in Modula-II, Niklaus Wirth, Springer-Verlag, 1982]. The directory clause declares that the type Offset from the interface Token is used in LineBreak.mesa. Next, the file is declared as a DEFINITIONS file since the function of the file is to define data-types and procedures.

The data structure defining the encoded array of tokens is EncodedText. Each element in the array is an Entry. Each Entry in the encoded text fits in one word of memory. The entry is a record that has two variants: a token or an escape.

The token variant consists of two fields: the number corresponding to the atom the token refers to, and a Boolean indicating whether or not a space follows the token. To maximize the performance, the token assigned to each atom is chosen in such a way as to allow it to be used to determine the location in memory of the properties for that token.

The escape variant of the Entry record is itself a variant record. This variant is used to encode information that cannot be represented with token entries.

The changeBase escape variant is required to encode large documents. Since the offset in the token variant consists of only 14 bits, the number of tokens that can be directly addressed is limited. The changeBase escape allows the address space for token properties to be changed, and thus allows a very large number of token properties to be addressed.

The space escape variant is used to represent consecutive spaces. This is needed because the token entry can only encode whether a single space is following an atom. The space variant has no parameters.

The zeroWidthSpace escape variant is used to represent a non-hyphenating break point in an atom. This is a seldom-used feature in the XICS markup language [Xerox Integrated Composition System User Guide, Xerox Corporation, 1987]. The zeroWidthSpace variant has no parameters.

FIG. 2 is the list of tokens that would be created from the text of FIG. 4. The table consists of the contents of each entry of the encoded text, one entry per row of the table. For the sake of clarity, the text for each token is included immediately to the right of each token Entry in FIG. 2. The first row of FIG. 2 contains an escape Entry that is a changeBase variant. It sets the address space for the token properties to the first address space. The address of the token properties is computed by combining the base address defined in the changeBase entry and the offsets in the token entries. The second row of the table contains a token variant entry. There are two items for each atom: a number identifying the atom, and a bit indicating whether there is a space after the atom. In this coding scheme, the space between atoms is part of the preceeding atom. For example, the first word "The" is assigned the values

[spaceFollows: TRUE, offset: 1].

Similarly, the second word, "approach" is

[spaceFollows: TRUE, offset: 20].

The ninth entry is the word "the" again, but with a lower case "t". This atom can not be given the same token as the original "The" which had a capital "T" because the widths of the characters will not usually be the same. The seventeenth entry is a left parenthesis. It is coded as

[spaceFollows: FALSE, offset: 323].

The 29th item on the list, the word "or" is the same word as the 18th word on the list. They will have identical properties and will therefore use the same token. Likewise, the commas of entries 26 and 28 will have the same tokens.

Each token has an associated list of properties, as shown in FIG. 3. The set of properties is made up of two records: the TokenProps.Object and an instance of the record TokenProps.Trailer. Both of these records are declared as MACHINE DEPENDENT to force the Mesa compiler to pack the fields into as few words of memory as possible. By ordering the values in terms of decreasing frequency of access, the number of memory references needed to access the token properties could be minimized. Since in the Mesa programming lanugage indeterminate length arrays can only be located at the end of a record, two records were required to achieve the optimal order.

The first field in the Object record is a Boolean which indicates whether the atom is a punctuation mark. This field is used during line-breaking computations to determine where legal breaks can occur.

Next is a number identifying the style, size, stress and weight of the font. This number represents the last font from which the values of the atomMetrics, breakPoint array (if present) and the display bitmap were computed. Thus if the current font in which the atom is being processed is the same as the last font in which the atom was processed, the values in the property records are simply accessed and not recomputed, since the values are still correct. Otherwise, the values in the property records must be recomputed prior to processing the current token.

The third field is called the AtomMetrics and is also defined in the TokenProps interface. This record contains the metric information for the entire atom. The values in the AtomMetrics record are the length of the atom in micas (a machine independent unit defined as 1/2540th of an inch) and pixels (screen units) and the length of the atom text in bytes. English text would typically require one byte for each character, but more bytes per character may be required in another language or for representing special technical symbols. See The Xerox Character Code Standard [The Xerox Character Code Standard, Xerox Corporation, 1986] for a method of encoding international characters and special symbols that would require more than one byte per character.

Figure 6:
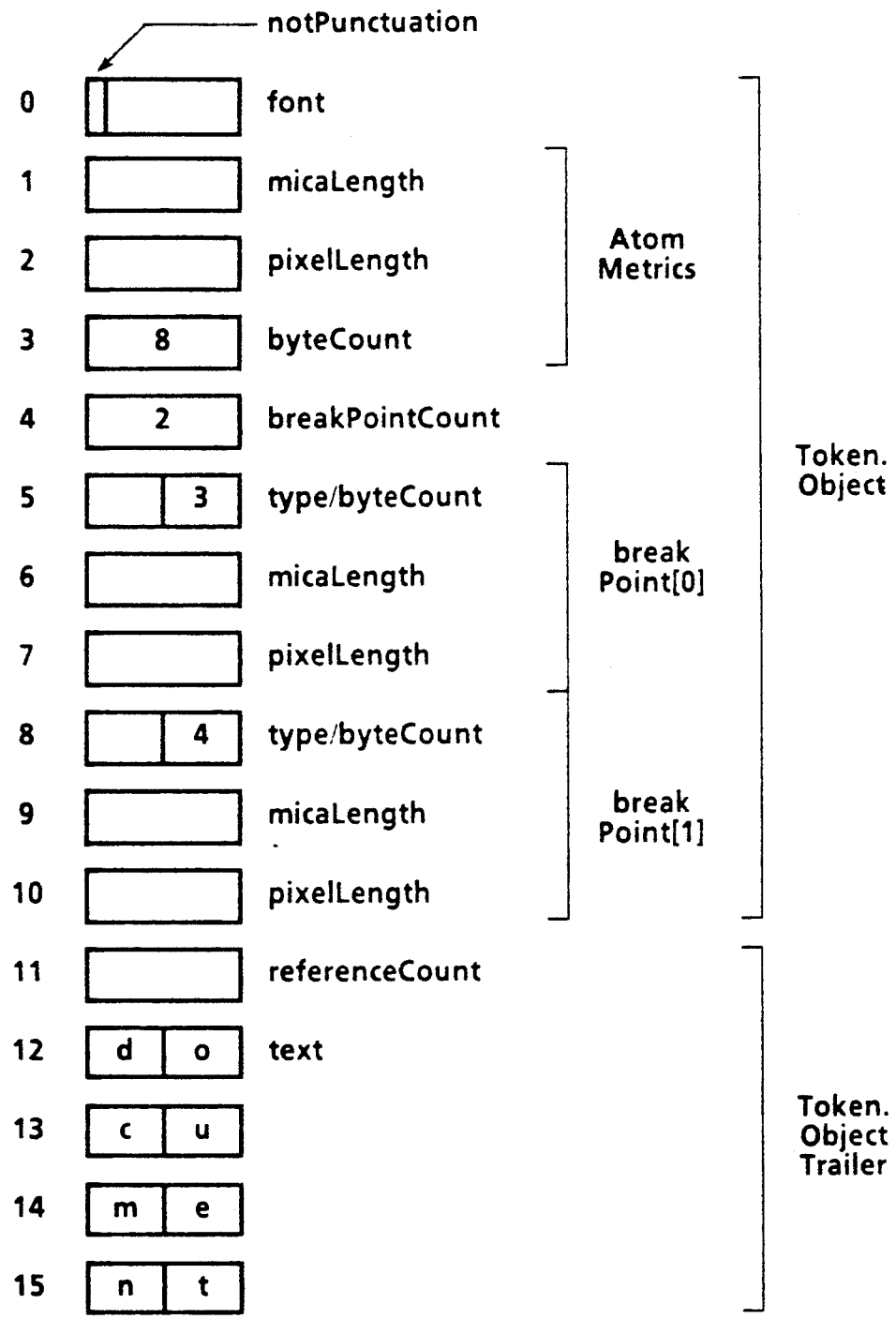
FIG. 6 is the memory layout of the token properties defined in FIG. 3 for a token that has two break points.

Following the atomMetrics is the breakPointCount, which corresponds to the number of places an atom can be broken between lines. Break points are usually determined by hyphenating a word. A word may also include manually inserted zero-width spaces. In this encoding technique, the atom "the" has no break points. The last field in the Object is the breakPoint array. This array may be omitted altogether if there are no break points in the atom. FIG. 5 shows the memory layout of the properties for the atom "the". If there are break points in the atom, each element of the breakPoint array will consist of the first parts of the divided words that can be formed by hyphenating the original word. For example, the three-syllable word "document" will have two break points: information to describe "doc-" and "docu-". This is shown in FIG. 6.

The first element in each breakPoint array entry consists of the break point type, which is a parameter representing how desirable the break point is. This is used by the line-breaking algorithm. The byte count is the byte count of each alternative. Length is the length of each alternative in machine independent units and in pixels.

The second record describing the properties is the ObjectTrailer record. The trailer record is always present in the token properties.

The first field in the ObjectTrailer is the referenceCount. This is used by the editor's dynamic memory manager to determine when to free the space for a set of properties. Typically this is done when the reference count reaches zero.

Figure 7:
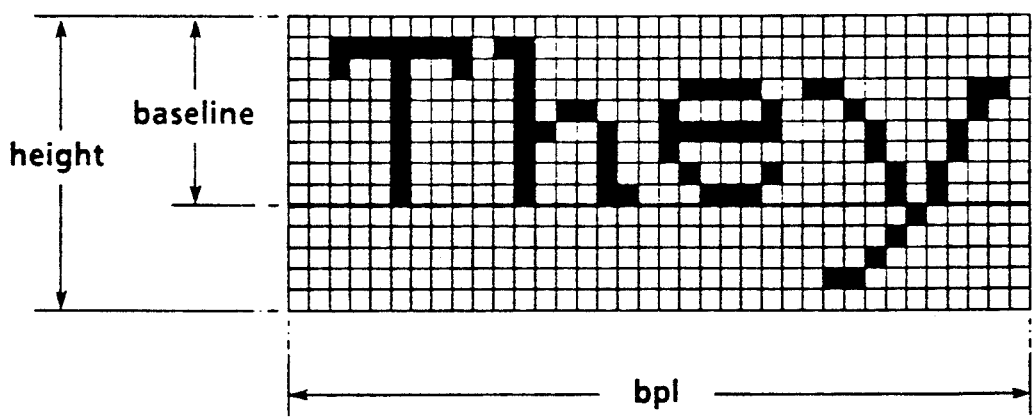
FIG. 7 is a diagram of the parameters defining the display bitmap portion of the data structures in FIG. 3.

The next field is the raster. The raster is a record called RasterData and is the information that described the cached screen resolution image of the atom. The first item, bpl, is the total pixels in each horizontal scan line. If the bit map, for example, is divided into sixteen-bit words, this number will typically be a multiple of sixteen bits even if the image of the atom occupies a smaller "width" as for the individual letter "i". The actual width of the image in pixels is stored in the atomMetrics. The second item is the total number of words of memory that are required to store the entire bit map for this atom. For example, if the width in pixels of an atom is thirty bits and an image is 14 pixels high, then the bitmap will require 28 words. This number is derived as follows:

height*bpl/bits-per-word where the bpl is defined, by convention, to be the smallest multiple of the bits in a word of memory that is greater than or equal to the width of the width of the image. The height is the height of the image. The baseline is the number of scanlines down from the top of the image to the scanline that the text will appear to sit on. Bits is a two word pointer to the first word of the image. See FIG. 7 for a graphic representation of the fields in the RasterData record.

The final field of the Trailer record is called text. This is an array containing the characters in the token. The array length is stored in the AtomMetrics, defined above. To optimize searching for tokens, the number of bytes allocated for the text field may actually exceed the number of characters in the token. The number of characters allocated will usually be a multiple of two or four, depending on the particular machine the algorithm is implemented on.

FIG. 9 is the Mesa source code which defines the data and procedures for computing line breaks. The directory portion of the file defines the elements of other interface files that are referenced in LineBreak.mesa. LineBreak.mesa is declared as a DEFINITIONS file since the function of the file is to define data-types and procedures.

SuffixChar is a type that defines possible final characters that can appear at the end of a line of text. This is required for the display algorithm. SuffixChar is declared as machine dependent to ensure that the values assigned to each element in the enumerated type are consecutive and begin with 0.

Reason is an enumerated type that lists the possible reasons that the line-breaking algorithm can return. Reason is also machine dependent since the line-breaking algorithm depends on the particular values the compiler assigns to each element in the enumerated type. The following table defines each of the values of Reason:

| | |
|---|---|
| margin | the current token has exhausted the line measure and a line-breaking decision has been made. This means that a line break was identified that satisfied all of the constraints placed on the algorithm. |
| normal | the current block of text has been exhausted with no line-breaking decision being made. |
| changeBase | the current token is a changeBase escape |
| invalidProps | the properties for the current token are out of date and need to be recomputed with the current font |
| contiguousWords | the current token is not preceded by a space or punctuation mark. This usually implies that the two tokens are fragments of a single word. This result enables the client code to adjust the metric information for kerning and letterspacing, as well as to keep track of the beginning of the fragmented token in case a sequence of token fragments needs to be hyphenated. |
| unableToBreak | a line-breaking decision could not be made even though the current line measure has been reached. The most common event that causes this result is that the token that overruns the margin is a punctuation mark. |
| specialGermanCase | this reason is returned when the line-breaking algorithm attempts to break a token that requires respelling at the desired hyphenation point. |

TwelveBits is a type that defines a twelve-bit unsigned integer. It is used in the StateRec record that is described below.

ArgRec is a machine dependent record which is the argument to the line-breaking algorithm. It is machine dependent because, where possible, several fields in the record are packed into a single word of memory.

The first field in the record is called text, which is a descriptor representing the array of tokens to be processed. The descriptor occupies three words of memory, with the first two words consisting of a pointer to the first token and the final word defining the length of the array.

The field propsBase is the base address used to resolve the relative pointers embedded in the token entries of the encodedText array. See FIG. 2 an example of an encoded text passage. After the propsBase is a boolean called hyphenate. If hyphenate is TRUE then the line-breaking algorithm will attempt to hyphenate the token that crosses the line measure; otherwise the algorithm backs up to the last complete token that fit in the measure. The next field represents the style, size, stress and weight of the font being processed. If the font field in the ArgRec does not match one of the font fields in the tokenProps, then the algorithm returns with a reason of invalidProps. The field after font is the margin, which is the line measure in micas.

The next two fields in the ArgRec are the hyphenPixelLength and the minSpacePixelLength. These, respectively, define the width a hyphen and the minimum width a space can be in screen units (pixels). The next two fields are the width of a hyphen and the minimum width of a space in micas.

The whiteSpace field defines the maximum size of a space in micas. It is not neccessary to also define the maximum size of a space in pixels, because only the mica measure is used in making a line-breaking decision.

The final two fields in the ArgRec are called final and prior. Both of these are instances of the LineBreak.State record. These fields will be referred to in Mesa notaion as arg.final and arg.prior, respectively. These values in these records are used by the line-breaking algorithm for temporary storage and to record the result when a line-breaking decision is made. The values in the arg.prior represent the last break point passed in the current block of text. Similarly, arg.final contains the data for the final token that was processed before the current exit of the line-breaking algorithm. If a line-breaking decision has been made then the values in arg.prior contain the values for the end of the current line, and the values in arg.final are those to begin the next line.

The first field in the LineBreak.State record is the index. This is the index of the current token relative to the beginning of the encodedText. The micaLength and the pixelLength are the cumulative widths in micas and pixels, respectively, of the tokens allocated to the current line. Note that these are specifically not the cumulative widths of the tokens in the current text block. The next field is the count of the blanks encountered on the current line. After the blank count is a boolean called notPunctuation. This field indicates whether the last token was a punctuation mark or not. This field is used to determine the locations of legal break points in a line. The suffixChar is a code representing the last character on a line after a line-breaking decision is made. The possible values of suffixChar were previously defined in the enumerated type SuffixChar. The byteCount field is the total number of bytes in the tokens that have been allocated to the current line. The final field, whiteSpace, is the maximum amount of white space that the line-breaking algorithm can allocate to the line when making a line-breaking decision.

ArgHandle, ArgSpace, and argAlignment are three types that define data structures needed to align the ArgRec in memory in such a way as to avoid crossing a page boundary. This invariant is an optimization used by the micro-code implementation on the Xerox 6085 workstation. Since ArgRec is 23 words long, the record must start on a 32 word boundary to guarantee that it does cross a page boundary. ArgSpace defines a block of memory 55 words long—which guarantees that there is a 32 word boundary in the range, with sufficient space after the boundary to contain the entire record. LineBreak.AlignArgRec is a procedure that takes as an argument a pointer to one of the 55 word blocks of memory, and returns a pointer to the 32 word boundary that is contained in the block.

LineBreak.SoftwareLineBreak and LineBreak.LineBreak define the Mesa and micro-code versions of the line-breaking algorithm that will be defined in the next section. The two procedures return the same results, the difference being that the latter is implemented as a custom machine instruction on the 6085. The argument to both of these procedures is a pointer to the ArgRec, and both return a LineBreak.Reason.

FIG. 10 is the contents of the file LineBreakImpl.mesa. This file supplies the implementation of the interface LineBreak. The list of names in the DIRECTORY section of the file declares the names of interface files that are referenced in LineBreakImpl. In the next source statement, LineBreakImpl is declared as a program (rather than a definitions file as before) which uses (IMPORTS) a subprogram from the interface Frame, and shares (EXPORTS) a program via the interface LineBreak. A constant nullData is declared immediately after the PROGRAM statement.

The Linebreaking Algorithm

SoftwareLineBreak computes line endings based on the margin stored in the argument arg. The program is designed to handle cases that require more than one block of text in the same line. The design is also independent of the method that the application using the program uses to store the text. The main procedure is organized to include four nested subprograms.

WholeWordBreak is the logic that is used when a line-ending decision is made at the end of a whole word or at a space. WholeWordBreak initializes data in arg.final to refer to the beginning of the token after the one that ends the current line. This procedure is declared as an INLINE procedure to indicate that it is to be treated as a macro, which implies better performance for short procedures.

SaveThisBreak is a procedure that transfers the contents of arg.final into arg.prior. The logic may need to revert back to the values in arg.prior if the next token can not be added to the current line. This procedure is also declared to be an INLINE for the sake of performance.

ProcessSpace checks to see if the current space will fit on the line. If not, then processing is terminated and the routine returns a TRUE value. If the current space fits, then the data in arg.final is modified to reflect the values at the current point. In this case, the routine returns a value of FALSE. ProcessSpace is also treated as a macro to optimize performance.

HyphenateWord is the subprocedure that is executed when the margin is crossed by a token. The algorithm branches to the unable ToBreak exit clause if the last token that was processed was not a punctuation character. This exit results in the reason being set to unableToBreak. In this context a space is considered as a punctuation character. Similarly, if there are no break points to choose from or if hyphenation is not selected for the current block of text, then the algorithm exits through a branch to the noneFitsExit clause. If this path is executed, then the last token processed is selected as the break point, and the values of final are initialized with the procedure WholeWordBreak.

At this point the algorithm has determined that hyphenation points exist and that it is appropriate to try to select one of the break points. Before entering the main loop two variables are initialized. The first is a pointer to an element of the break-point array. This variable is initialized to point to the first element of the break-point array in the token being broken. The second variable is the minimum width that the text including the portion of the final token must be to satisfy the white space constraint.

The main loop in HyphenateWord selects the best possible break point from the break points in the list. The algorithm requires that the break points be sorted on two keys: first in decending order of priority (in otherwords the most desirable breaks come first) and within each class of priority, decreasing order of position in the token. This ordering allows the algorithm to detect the optimal break point with a single pass over the break points. The optimal break point is the one with the highest priority and that results in the tightest fit for the line.

Three exceptions cause the algorithm not to select the break point based on the highest priority and tightest fit criteria. The first exception is for a special case break point such as a German word that would require respelling if the break point is selected. The second exception is if there is a manually inserted or "hard" hyphen. In that case the manually inserted hyphen is chosen whether or not it gives the best fit. The third exception is if all of the break points are too large—that is none result in at least the minimum whitespace—then the algorithm terminates without selecting a break point and the boundary of the previous token is used for the termination of the line.

If a suitable break point is selected, HyphenateWord exits through the successExit clause. The first four statements of the clause update arg.final and arg.prior fields, respectively, to reflect the break point that has been selected. Next, arg.final is updated to represent the part of the token beginning the next line. The manner in which arg.final is updated depends on the type of the selected hyphenation point. If the break point is a synthetic hyphen generated by the breakpoint logic, the break-point metrics must be adjusted since the hyphen is not actually part of the token. The most common hyphens that are not synthetic are hard hyphens.

When any form of hyphen is chosen to terminate a line, micalength, pixelLength, and byteCount are all assigned negative numbers representing the portion of the token ending the previous line. The value of index remains unchanged so the same token begins the next line. When the negative values in arg.final are added to the values for the entire token, the results are the proper values for the portion of the token beginning the new line.

The main part of SoftwareLineBreak begins with the initialization of pointers to arg.final and arg.prior. The main loop is executed as long as arg.final.index is less than or equal to the length of the current text block, arg.text. The processing that is done on each token entry in arg.text depends on the type of the token entry.

If the type is a token entry, then the first statement in the token branch of the variant select statement dereferences several of the levels of indirection to speed processing. Next, the font that is desired for this text block is compared to the font that was last used to compute the atom metrics. If the font is incorrect then the main loop exits through the invalidProps clause which in turn causes a return from the procedure with a reason of invalidProps. This gives the caller an opportunity to recompute the token properties and restart the procedure. If the properties are still valid then the computation is made to determine whether the entire token fits on the current line. If it does not then the loop exits through the marginExit clause, and hyphenation is attempted. If the token fits, then a check is made as to whether the algorithm has encountered two consecutive tokens without either a space or a punctuation mark. If so then the loop is exited through the contiguousExit clause.

At this point it has been determined that the current token fits on the line and that it can be added to the line. The next four lines of the main loop update arg.final to reflect this. The final statement in the clause checks whether the spaceFollows Boolean is TRUE for this token. If it is then the ProcessSpace subprocedure is executed. If the space does not fit on the line, then the main loop is exited through the simpleMarginExit since it is clear that hyphenation is not needed. If the space fits, then the token branch of the select statement is exited, final.index is incremented, and the next entry in the text block is processed.

The other branch of the variant select statement in the main loop is executed if the text entry is an escape variant of the Token.Entry record. As was described in FIG. 1, the escape variant is itself a variant record (refered to as an anonymous record in Mesa). Therefore, the escape arm of the select statement is also a select statement. As mentioned previously, the three variants of this record are space, zeroWidthSpace, and changeBase.

Processing for the space variant consists of executing the ProcessSpace subroutine. If the space does not fit on the line then the main loop is exited through the simpleMarginExit clause. When a zeroWidthSpace is encountered the final.suffixChar is updated to reflect this. The current position on the line is made a viable break point in case the next token does not fit. A changeBase escape causes an exit from the main loop through the changeBase exit clause. No other processing is needed, since the caller updates all of the necessary data structures including arg.propsBase. If the processing on the escape entry is completed without an exit being executed, then the clause is exited, final.index is incremented and the processing of the next text entry is begun.

If the entire text block is processed without making a line-ending decision, then the procedure exits through the FINISHED exit clause of the main loop.

FIG. 12 shows the values in the argRec prior to beginning processing of the text in FIG. 4, and then after each of the first three lines that were computed. In the first instance the value for text is the descriptor that represents the encoding in FIG. 2. The values have been deleted for the sake of brevity. The values for font, margin, hyphenPixelLenght, minSpacePixelLength, hyphenMicaLength, minSpaceMicalLength and whiteSpace are all set for a 10 point serif font. The values of final and prior are all set to initial null values since no tokens have been processed.

The second value of arg in FIG. 12 corresponds to the values in arg after the first line has been computed. Only the values in final and prior have changed. The final.index and the prior.index are the same, since the last token on the first line was hyphenated. Notice that in FIG. 2 the tenth entry (starting with the first element as number zero) corresponds to the token "document". The values in arg.prior correspond to the accumulation of the first ten tokens plus the portion of the eleventh token through "docu". The negative numbers in arg.final correspond only to the portion of the last token included in the values of arg.prior. When these values are added to the first token of the next line (which will be the values for the entire word "document") the result is that the proper part of the word, "ment", is added to the line values. This is shown graphically in FIG. 8. By processing the same token twice when the line-breaking decision requires splitting a token across two lines, the code that calls SoftwareLineBreak can be written with logic that is largely independent of whether hyphenation has occurred. This invariance results in very efficient pagination code.

After the second line is computed, the values in arg will be those in the third value of arg in FIG. 12. Notice that in this block the value of margin changed to reflect that the second line was not to be indented. Since the second line is not hyphenated, the values for arg.final,index and arg.prior.index are different. This is appropriate since the second line ends on entry 21 which is the token "each", but the third line begins with entry 22 "unique". Since the final token of the second line is not hyphenated, there are no carryover values from line to line as there is with the first line. Therefore, all of the other values of arg.final at this point are null.

The final value of arg in FIG. 12 corresponds to the third line of FIG. 4. This line started with a complete token and ended with a complete token.

FIG. 11 is the equivalent of the program in FIG. 1, FIG. 3, FIG. 9 and FIG. 10, written in the C programming language. This program will run on any computer that provides a C compiler, including any member of the Sun Micro Systems 3 and 4 family of minicomputers, such as the model 3/50. This code has also been run on the DEC Vax 7xx family and microVax computers.

The Display Algorithm

There are two main differences between the line-breaking and display algorithms. First, rather than accumulating the token metrics to determine where a line ending is, this information must have been previously computed and passed into the display algorithm. The information concerning the number of tokens (or parts of tokens) and the cumulative metric information is required at the beginning of the display process. This information is required so that if justification is desired, the appropriate adjustments can be made to the placement of the tokens. Similarly, when certain text formatting modes are desired, the display algorithm must have available to it the width of the tokens to be painted before the first token is displayed. Examples are ragged left mode and modes where the text is centered on a column, page or arbitrary measure. The second difference is that the display algorithm accesses the Raster Data in the TokenProps.TrailerObject (FIG. 3) to accumulate a display bitmap of a line of text. This is done using the BitBlt machine instruction on the Xerox 6085 Workstation [Pilot Programmer's Manual, Xerox Corporation, 1985] which is similar to raster processing support on most machines. The description of the bitmap that this instruction uses for the source bitmap includes both a width and a bit offset into the bitmap. These parameters allow the painting of only a portion of a token bitmap when a token is broken between two lines, usually by hyphenation. Consider an example where the width of a token bitmap is 30 bits, and the token is hyphenated at a break point 17 bits into the image. To paint the portion of the image prior to the break point, the width would be set to 17 and the offset would be 0. To paint the portion after the break point, the width would be 32 minus 17 or 15 bits, and the offset would be 17 bits. See line 2 of FIG. 4 and FIG. 8 for an example of when this is important.

Painting text a token at a time can now be compared to the same process done a character at a time. In both cases the same number of bits of font (or text image) information is passed to the display, but the performance is significantly faster in the case of a token at a time. The difference in performance is largely a result of the smaller number of times that each word of memory storing the (system) display bitmap needs to be accessed. The number of memory references is much larger when the text is displayed a character at a time. The width of a typical character bitmap is on the order of four to six bits for font sizes normally used for document body text (i.e. text that is not used for special functions such as headings and footnotes). This implies that, for machines with sixteen-bit word lengths, each word of display memory is accessed three to four times while the bitmaps of contiguous characters (as in a word of text) are written into the display bitmap. If a machine has a memory word length of thirty-two bits then each word of memory will be accessed six to eight times while an image is assembled.

The performance difference between painting text a character at a time and a token at a time is even more significant if the text includes characters that require the overstriking of several characters or portions of characters. Examples of where this could occur is accented characters and mathematical symbols that are not normally included in fonts. Once the images of these special characters or symbols are generated and inserted into the token properties, they can be reused as long as the font does not change.

Modifying Documents

This invention will now be described as applied to a WYSIWYG document editor used for publishing applications. It could also be used for other text processing applications. The documents processed by this system comprise a sequence of elements consisting of formatting commands (or markups) interspersed with fragments of text. The fragments of text are in turn sequences of tokens. Each element in the document is called a piece, and the entire data structure is called a piece table. A piece that represents a Token. Entry vector (and thus has content that is text) is referred to as a text piece. To facilitate the modification of the document, the individual pieces are linked in both directions with pointers.

The Selection

The user modifies a document by identifying a portion of the text and then invoking one of the editing operations normally implemented in a WYSIWYG editor or text processing system. The portion of the text that is operated on is called the selection. The selection may consist of as little as a single character, a series of contiguous characters or words, or even the entire document. The selection is usually indicated by changing the appearance of the text. On systems with a high resolution screen the preferred method is displaying the selection in reverse video.

In addition to having a beginning and an end, the selection also has an insertion point. It is usually at the end of the selection, but can also be at the beginning of the selection. The insertion point is typically identified with a blinking caret. The piece table entry that contains the insertion point is defined as the input focus. Even though visually the input focus may appear to be attached only to text, it is entirely possible that the insertion point may actually be attached to a piece table entry containing commands.

The operations a user can perform on a selection are to delete it, backspace over one or more characters or words beginning at the insertion point, or add characters after the insertion point. Backing up in units of words is referred to as a backword operation. In each case the algorithm that operates on text represented with this invention is somewhat different than the equivalent algorithm for processing a document encoded as a series of characters.

Once one of the operations mentioned above is performed on a selection, the selection is deactivated. This is indicated to the user by de-emphasizing the text in the selection, if any remains, after the operation.

Resolving Mouse Clicks

Portions of the text are selected by converting the coordinate information from a pointing device into a position in the document. This process is called resolving the position in the document. Virtually all interactive WYSIWYG systems have some form of pointing device. Most commonly the pointing device is a mouse. Much less frequently it is a set of cursor keys.

The pointing device provides coordinate information at regular intervals while the device is active. The process of converting the coordinate information into a position in the document is facilitated by this invention.

The resolving algorithm proceeds in three phases. First, the line of text containing the coordinate is located; next the specific token is identified; and finally the character is located. The editor must provide some way for the resolving software to determine which line of text contains the new coordinate. Typically this is done with a table of line boxes. The information describing the line box is the location (or orientation) of the line, dimension of the line, and beginning offset of the first token on the line.

Once the line is located, the resolving algorithm can enumerate the tokens in the line to determine in which token the coordinate is located. At this point the individual characters can be inspected to determine in which character the coordinate falls.

The table of line boxes is essential if the editor design supports multiple line-setting modes. If the text is set with variable-width spaces, or text that is not aligned along the left side of the column, then the information related to the number and width of the spaces must also be included in the table. On fast processors it is possible to replace the line table with a procedural interface to the pagination logic that returns the information in the nth line box by paginating the appropriate page through the nth line.

By proceeding across the line a token at a time rather than a character at a time, as is classically the case, the resolving process proceeds much faster. In particular, with complex text such as international or mathematical text that can not be represented by a single byte per character, the method described here will be significantly faster.

The Delete Algorithm

The algorithm for deleting a portion of a document encoded as a sequence of tokens is very similar to the algorithm for deleting text stored as a sequence of characters stored in a piece talbe. In the general case, a deletion is performed on a selection consisting of more than one character where the first and last character in the selection are not in the same piece table entry. The simplest case is when the begining of the selection is just after a space (the beginning of a token) and similarly, when the end of the selection is just before a space. In this case no new tokens are created as a result of the deletion, but as many as two new pieces are created, depending on whether the beginning and end of the selection are in the same piece of text. The encoding of the space immediately after the selection will have to be changed to the space escape variant of the Token.Entry if the space is encoded using the spaceFollows boolean in the last token of the selection. If one end of the selection falls on one of the interior characters of the first or last token, then new tokens will result from the deletion. If this is the case, then a changeBase escape Token.Entry may need to be added to the resultant pieces to reflect the base address of each new token.

The text in FIG. 13 contains the same text that was previously shown in FIG. 4. The highlighted portion of the text represents a selection that will result in several new tokens being created when the selection is deleted. For the sake of illuminating the most general case, it is assumed that the new tokens will be located in a different area of memory than the area used for the existing tokens (base address number 1). The deletion will result in two pieces, one for the portion of the text prior to the selection and a separate piece for the portion after the selection. FIG. 2 contains the piece table entry for the remaining portion of the paragraph prior to the deletion. FIG. 14 shows the beginning and end of the initial fragment of the text. (The missing portion of the piece corresponds to the portion of the piece in FIG. 2). Notice that a changeBase escape Token.Entry is required because the new token is not in the same token props area that the other tokens are in. FIG. 15 shows the tokens in the second piece table entry. Again, the new token is preceded by a changeBase escape Token.Entry. A second base address change is needed in this piece to set the base address back to the first address space used for the remaining tokens.

The Modifiable Token.Entry Array and Token Properties

Piece table entries (and the contents of the entry) are typically fixed length to minimize storage requirements. Insertion, backspace and backword all result in changes to the content of the piece table entry containing the insertion point. It is impractical after each operation to allocate new space for the modified contents, copy the content of the input focus to the new space, update the contents of the new piece to reflect the change, and deallocate the old contents. Performing these operations repeatedly would result in fragmented dynamic memory and inadequate performance. A way to avoid this fragmentation is to identify transient resources that can easily be modified. Specifically, a preallocated Token.Entry array that is arbitrarily long could be substituted for the actual contents of a piece when one of these operations is selected. Now the length of the array simply has to be adjusted at the end of each operation to reflect the changes.

When the first operation requiring the modifiable entry array is invoked, content of the input focus is copied into the modifiable entry array and a reference to the modifiable content is placed in the input focus. The editing algorithm is then invoked. The contents of the input focus remain in the modifiable space area until an event transpires signalling that no further operations on the modifiable piece can occur. Events of this nature include the user ending the edit session on the document, or moving the selection to another portion of the document. After the last edit is performed any content remaining in the input focus is made permanent by allocating a new space, copying the content of the modifiable space into the new space, and placing a reference to the new space in the input focus.

Insert and backspace also require a modifiable token property area to avoid similar performance problems resulting from repeatedly allocating and deallocating token properties during rapid operations. A reference to the modifiable token property space is substituted for the last token variant in the modifiable Token.Entry array when the first insert or backspace is invoked. The contents of the modifiable token properties are then either discarded or transferred to a permanent property space depending on the sequence of operations. This will be described in more detail below.

The modifiable Token.Entry array can be of limited length. In general, a length of one thousand tokens will seldom be exhausted, and this length imposes few constraints on the implementation. The modifiable token property space need be only long enough to hold the maximum number of break points the implementation allows.

By convention the modifiable token property space is defined to be offset one in base address zero. This convention will be used in the editing algorithms described below.

Backspace

When a backspace operation is invoked, the algorithm checks on which end of the input focus the insertion point is located. If the insertion point is on the right side of the input focus, then the algorithm proceeds with then next step. When the insertion point is on the left side of the input focus, then the input focus is moved to the next prior piece table entry that contains text. The insertion point is moved to the right side of the input focus. If there are no prior text pieces the algorithm terminates.

Next, a check is made as to whether the content of the input focus has been copied into the modifiable entry array. If the content of the input focus have been copied, then the portion of the algorithm that deletes the last character is invoked. Otherwise, the content of the input focus is copied into the modifiable Token.Entry array. The first step in this process is to replace the address of the text in the input focus with the address of the modifiable entry array. Now the algorithm can proceed to delete a character.

Once the content of the input focus has been copied to the modifiable Token.Entry array, the backspace algorithm begins by locating the last content bearing entry in the array. A content bearing entry is a Token.Entry that is not a changeBase variant. The algorithm begins with the last element of the array and proceeds backwards inspecting each successive element. This process terminates, when the first content bearing entry is located. If the entry is a space escape Token.Entry, then the token array is shortened by one to delete the space. The algorithm then terminates since a character has been deleted. Similarly, if the entry located by the scan for a content bearing entry is a token Token.Entry with the spaceFollows boolean set to TRUE, then deleting the character consists of setting the boolean to FALSE. The content of the input focus stays the same, since the final content bearing entry was not eliminated but only changed.

The final case is when the final content bearing entry is a token Token.Entry that does not have the spaceFollows boolean set to TRUE. If the properties for the final token are not already in the modifiable token property area then the contents are copied and the entry array is updated to reflect this. In general, the content bearing entry is replaced with two entries. The first is a changeBase escape Token.Entry to set the base address to zero (the modifiable token property area), and the second is a token Token.Entry with an offset of one. Finally, the length of the content of the input focus is updated (usually by incrementing the length by one).

The final portion of the backspace algorithm is the procedure to delete a character when the final element of the modifiable entry array is a token Token.Entry which has already been copied to the modifiable token property area (from a previous operation) and the spaceFollows boolean is already FALSE. The first step is to determine how many bytes need to be deleted to eliminate the last logical character. International characters such as accented characters may be represented by byte sequences longer than one byte. If the resulting deletion does not exhaust the bytes in the token properties, then the properties are updated and the algorithm terminates. If deletion exhausts the bytes in the distinguished token property area, then the length of the distinguished token array is reduced by one and the procedure to locate the first preceding content bearing entry array element is executed.

Backword

The first two steps of the backword algorithm are identical to the backspace algorithm: if the insertion point is on the left side of the input focus, then the content of the next prior piece containing text is set as the input focus and the insertion point is moved to the right side of the new input focus. Next, if the content of the input focus is not in the modifiable entry array, then the content is copied into the modifiable array, and a reference to the modifiable entry array is placed in the input focus.

Once the content of the input focus is copied to the modifiable entry array, the backword algorithm locates the last content bearing entry in the array. This entry must not be a space. Next, a second scan is initiated to locate the next prior space or punctuation mark. The scan logic must include the possibility that a word may be fragmented into two or more contiguous tokens or that the token being deleted is the first token in the document.

Once the right boundary of the backword is identified, all of the subsequent tokens are deleted by adjusting the length of the modifiable token array. Notice that since the backword algorithm always results in the elimination of an integral number of tokens, no new tokens are created.

Insert

The insert algorithm also requires the modifiable entry array, so the insert algorithm also begins by determining what content, if any, from the input focus must be moved into the special entry array. If the insertion point is on the left side of the input focus, then a new piece table entry must be created and linked into the table prior to the input focus. The new piece is now made the input focus and the insertion point is moved to the right side of this piece.

If the insertion point is on the right side of the input focus and the content of the input focus is not in the modifiable entry array, then the content of the input focus is copied there and a reference to the modifiable entry array is placed in the input focus.

Now a character can be added to the document. The logic that is executed depends on the class of character. The basic classes are space, letters, and punctuation marks. Punctuation marks are characters that are never included in a token. These are also identified to the line-breaking algorithm to assist it in determining where allowable break points are. In applications where significant amounts of numeric data are expected—such as financial text processing applications—then the implementation may need to treat numeric data in a special way. Since numbers tend to be unique, or nearly unique, the statistical properties that make this invention highly efficient for text will not be realized. The result will, very likely, be very large documents with prohibitive runtime memory requirements. One alternative is to treat tabular data as normal strings of text, or to create a special escape variant that would contain the numeric data.

When the first letter is encountered, the final token in the input focus is inspected. If it is not a reference to the modifiable token properties the reference is added to the end of the piece. This usually involves lengthening the contents of the input focus by two. A changeBase escape variant referring to the space containing the modifiable token properties is added followed by a Token.Entry referring to the modifiable properties. The metrics, break-point data, display bitmap, and character array should all be initialized to null values. If the final entry in the array is a token variant with the spaceFollows boolean set to FALSE, then the entry is replaced with the two entries required for the reference to the modifiable token properties. In this case the contents of the modifiable properties are initialized to be the contents of the token that was replaced.

Now the letter is added to the character array and the font is set to a value that forces a recomputation of the metrics and bitmap. In general, it is recommended that hyphenation of the new token be delayed until a break character (i.e. a space or punctuation mark) is encountered, unless the hardware is very fast.

Processing the second and subsequent (contiguous) letters consists of only the final step of those required for the processing of the first letter: the letter is added to the character array and the font field in the token properties is set to the special value that causes the invalidProps return from the line-breaking algorithm.

When a character that is not a letter is input after one or more letters, or the input operation is terminated, the contents of the modifiable token properties are converted into a permanent token. Since the new token may not have the same base address as the last token before the modifiable token properties, a changeBase escape may be needed.

If the event that terminates the input to the modifiable token properties is a space then the space should be encoded with the spaceFollows boolean in the new token. If a space is input, but no letters are in the modifiable token, then the space escape variant must be used. Similarly, if a punctuation mark is input after one or more letters have been input then the modifiable token properties must be converted into permanent properties prior to processing the punctuation mark.

The Search Algorithm

In general, a user searches for a string of text with the expectation that the algorithm will determine whether two strings are equivalent. Equivalence is defined to mean that the encoding for one string can be transformed into the encoding for the other string with no loss of information. Similarly, when searching for combinations of text and commands the expectation is that the effect of the commands will be recognised independent of the sequence of commands. For example, if the command for initiating bold text is

<BD> and the command for italic text is

<IT> then clearly, the effect on the text when the command sequence

<BD><IT> is the same as

<IT><BD>

Therefore, the two should be interpreted by the search as equivalent. Conceptually, this is equivalent to accumulating the commands in a buffer and inspecting them before the beginning of each text piece.

The equivalence of tokens is intuitive: a word that is split between multiple contiguous tokens must match the same content represented as a single token. The following algorithm will be presented in terms of equivalent tokens. Similarly, the equivalent encoding of a sequence of commands is also natural. Thus, the algorithm for searching when formatting commands are significant (that is that the looks of the search string are included in the search criteria) will also be presented in terms of a equivalent commands that are independent of the sequence of commands.

The search consists of processing three special cases: the equivalent token prior to the first delimiter, the equivalent token after the last delimiter, and the rest of the tokens. In this context a delimiter is defined to be a space or punctuation mark. The scan proceeds until a token is identified that is exactly equivalent to or ends in text that is exactly equivalent to the first token. The algorithm now processes each successive delimiter and interior token. If the match is exact the scan proceeds. Finally, the last token is compared. A match is identified if the final equivalent token in the search string is a perfect match with the corresponding token in the passage of text being searched. Similarly, the search is successful if the final equivalent token matches the beginning of the corresponding token in the text.

A slight generalization is required to define the search algorithm when formating commands in the target string are significant. Before the scan, the source string is converted into tokens and the effective commands are determined. At the beginning of each text piece, the state of the effective command is compared with the corresponding commands in the source string. If the effective command does not match the comparison fails.

Search and Replace

The search and replace function is defined in terms of previously defined edit operations. First, the source and replace strings are converted into a sequence of tokens. Then, the scan of the document is performed. When a match is made, the matched portion of the document is converted into an implied selection. The selection is then deleted using the previously defined operation. The encoded replace string is then inserted at the insertion point. The scan then proceeds to locate the next match.

Checking Spelling

The algorithm to check the spelling of the text in a document encoded with this method is very efficient. There are two cases to consider depending on whether the entire document is checked, or whether only a selected portion of the document is checked.

Prior to processing the document, two temporary data structures are created. The first is a list with an element for each unique token. Each element contains a reference count, and a Boolean field. The elements are initialized with the respective reference count and the value FALSE. The second is a list to retain each misspelled word that is composed of more than one token. This list is initially empty.

Processing the document begins with checking each entry in the document token dictionary against the spelling lexicon. Processing next proceeds to setting the appropriate Boolean field in the temporary list to TRUE for tokens that are identified as misspelled by the spelling lexicon. The document is now scanned for words that are composed of several contiguous tokens. For each instance of a composite token, the temporary reference count for each token in the composite is decremented, then the word is checked against the spelling lexicon. If the word is incorrectly spelled, the word is added to the misspelled list-if it is not already in the list. At the end of the document, words in the list of misspelled composite words are reorted to the user. Similarly, token dictionary entries that are marked as misspelled and that have a non-zero temporary reference count are also reported to the user.

In the second case of checking a portion of the text, only a list to contain the words that are mis-spelled is required. The processing consists of enumerating each word in the selected text, whether or not it is composed of several fragments, then checking the word against the spelling lexicon. Words that are misspelled are added to the misspelled list. After the last token is identified, the misspelled list is reported to the user.

External Document Representation

The text representation described here, coupled with the piece table, can be used as an extremely compact machine readable external form. Minimizing the external storage requirements consists of saving the piece table, the memory containing the Token. Entry arrays that the piece table refers to, and a subset of the token properties. Only the portion of the token properties that cannot be recomputed quickly needs to be written into the file. Thus the characters, an array noting the type and position of each break point, and the base address and offset of the properties should suffice. By not storing the break-point array, metric information and token bitmap image the property space can be reduced by at least three-quarters.

Typically, for large documents the compaction will be a factor that converges on twice the inverse of the average word length in the document. For standard English the ratio is slightly less than one third. For technical documentation that contains large numbers of longer words, the ratio will improve.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom.

2. A method of breaking lines of text comprising a string of atoms, said string of atoms comprising words, numerals, punctuation marks and spaces, into a list of tokens and a corresponding array of data blocks, and then deleting an atom therefrom, comprising the steps of:

determining whether the current atom in said string is identical to a previous atom that has been encountered earlier in said string,
a. if so, adding the token of said previous atom to said list of tokens, and proceeding to the next atom,
b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then,
a. if the previous atom was a space, breaking the current line at the end of the current atom, otherwise,
b. breaking the line at the end of the last token on the current line that was followed by a space, if said total width is not sufficient to fill the current line, proceeding to the next token, and then deleting the atom comprising the steps of:

deleting the token associated with the atom, and
deleting the data block associated with the deleted token if there are no further references to the data block.

3. A method of breaking lines of text comprising a string of atoms, said string of atoms comprising words, numerals, punctuation marks and spaces, into a list of tokens and a corresponding array of data blocks and using each successive token in the token list to determine a line break point, and then deleting an atom in a line thus formed comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, for each data block that contains a word, adding the hyphenation points of said word and the widths of each partial word thus produced by said hyphenation points to said data block using the current token to access the corresponding data block, adding the width of the current atom in the data block to a running sum of atom widths on the current line to determine the total width of all atoms on the current line, if the sum of widths is not sufficient to fill the current line, proceeding to the next token, if the sum of widths is sufficient to fill the current line, breaking the line at the end of the current atom and proceeding to the next line, if the sum of widths is too great to fit on the current line, dividing the current word at a hyphenation point, adding the beginning of the hyphenated word to the end of the current line, and starting the next line with the ending portion of the current word, and then the method of deleting an atom comprising the steps of:

deleting the token associated with the atom,
deleting the data block associated with the deleted token if there are no further references to the data block, and repeating the current line breaking steps, wherein two atoms are defined as identical when they have the same characters, style, size, weight, stress and capitalization.

4. The method of deleting an atom in a line of text formed by the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said said atom bit map into a line buffer to create a line bit map for raster imaging, and proceeding to the next atom comprising the steps of:

deleting the token associated with the atom,
deleting the data block associated with the deleted token if there are no further references to the data block, and beginning with the first token on the current line, break the current line in accordance with the method of determining whether the current atom in said string is identical to a previous atom that has been encountered earlier in said string,
a. if so, adding the token of said previous atom to said list of tokens, and proceeding to the next atom,
b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block.

5. A method of breaking lines of text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise, b. breaking the current line at the end of the last token on the line that was followed by a space, and if said total width is not sufficient to fill the current line, proceeding to the next token, and then deleting a character by:

deleting the token associated with the atom to be changed, substituting therefor a first token and a data block for the fragment of the atom preceeding the deleted character, and a second token and data block for the fragment of the atom after the deleted character, deleting the data block associated with the deleted token if there are no further references to the data block, and beginning with the first token on the current line, repeating the current line breaking steps.

6. A method of encoding text comprising a string of atoms, said string of atoms comprising words, numerals, punctuation marks and spaces, into a list of tokens and a corresponding array of data blocks and using each successive token in the token list to determine a line break point comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of atom widths on the current line to determine the total width of all atoms on the current line, if the sum of widths is not sufficient to fill the current line, proceeding to the next token, if the sum of widths is sufficient to fill the current line, breaking the current line at the end of the current atom and proceeding to the next line, if the the sum of widths is too great to fit on the current line, dividing the current word at a hyphenation point, adding the beginning of the hyphenated word to the end of the current line, and starting the next line with the ending portion of the current word, and wherein two atoms are defined as identical when they have the same characters, style, size, weight, stress and capitalization, and then deleting a character from an atom in a line of text thus formed comprising the steps of:

deleting the token associated with the atom to be changed, substituting therefor a first token and a data block for the fragment of the atom preceding the deleted character, and a second token and data block for the fragment of the atom after the deleted character, deleting the data block associated with the deleted token if there are no further references to the data block, and beginning with the first token on the current line, break the current line in accordance with the line breaking steps.

7. The method of deleting a character from an atom in a line of text formed by the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said said atom bit map into a line buffer to create a line bit map for raster imaging, and proceeding to the next atom comprising the steps of:

deleting the token and data block associated with the atom to be changed, substituting therefor a first token and a data block for the fragment of the atom preceeding the deleted character, and a second token and data block for the fragment of the atom after the deleted character, deleting the data block associated with the deleted token if there are no further references to the data block, and beginning with the first token on the current line, breaking the current line in accordance with the method of determining whether the current atom in said string is identical to a previous atom that has been encountered earlier in said string, a. if so, adding the token of said previous atom to said list of tokens, and preceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

delecting the token associated with the atom, and deleting the data block associated with the deleted token if there are no further references to the data block.

8. A method of breaking lines of text comprising a string of atoms, said string of atoms comprising words, numerals, punctuation marks and spaces, into a list of tokens and a corresponding array of data blocks comprising the steps of:

determining whether the current atom is said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise b. breaking the current line at the end of the last token on the current line that was followed by a space, and if said total width is not sufficient to fill the current line, proceeding to the next token, and then adding a character to an atom in a current line of text comprising the steps of:

deleting the token associated with the atom to be changed, substituting therefor
  (1) a first token and a data block for the fragment of the atom preceeding the inserted character,
  (2) a second token corresponding to
    (a) a data block created from the following method if the character is a space or punctuation mark, determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom or
    (b) special data block if the character is a letter or number, and
  (3) a third token and data block for the fragment of the atom after the inserted character, and beginning with the first token on the current line, breaking the current line in accordance with line breaking steps.

9. A method of breaking lines of text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise, b. breaking the current line at the end of the last token on the current line that was followed by a space, and if said total width is not sufficient to fill the current line, proceeding to the next token, and then adding a character to an atom in a line of text comprising the steps of:

deleting the token associated with the atom to be changed, substituting therefor (1) a first token and a data block for the fragment of the atom preceeding the inserted character, (2) a second token corresponding to (a) a data block created from the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said said atom bit map into a line buffer to create a line bit map for raster imaging, and proceeding to the next atom.if the character is a space or punctuation mark, or (b) special data block if the character is a letter or number, and (3) a third token and data block for the fragment of the atom after the inserted character, and beginning with the first token on the current line, breaking the current line in accordance with line breaking steps, and then adding a second character to an atom in a line of text thus formed comprising the steps of:

(1) if the character is a letter or number, adding the new character to the special data block created by determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise b. breaking the current line at the end of the last token on the line that was followed by a space, and if said total width is not sufficient to fill the current line, proceeding to the next token, and then adding a character to an atom in a line of text comprising the steps of:

deleting the token associated with the atom to be changed, substituting therefor (1) a first token and a data block for the fragment of the atom preceeding the inserted character, (2) a second token corresponding to (a) a data block created from the following method if the character is a space or punctuation mark, determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom or (b) special data block if the character is a letter or number, and (3) a third token and data block for the fragment of the atom after the inserted character, and beginning with the first token on the current line, breaking the current line in accordance with line breaking steps, determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise b. breaking the current line at the end of the last token on the line that was followed by a space, and If said total width is not sufficient to fill the current line, proceeding to the next token, and then adding a character to an atom in a line of text comprising the steps of:

deleting the token associated with the atom to be changed, substituting therefor (1) a first token and a data block for the fragment of the atom preceeding the inserted character, (2) a second token corresponding to (a) a data block created from the following method if the character is a space or punctuation mark, determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom or (b) special data block if the character is a letter or number, and (3) a third token and data block for the fragment of the atom after the inserted character, and beginning with the first token on the current line, breaking the current line in accordance with line breaking steps, (2) if the new character is a space or punctuation mark, (a) using the characters in the special data block with the method of breaking lines of text comprising a string of atoms, said string of atoms comprising words, numerals, punctuation marks and spaces, into a list of tokens and a corresponding array of data blocks, and then deleting an atom therefrom, comprising the steps of:

determining whether the current atom in said string is identical to a previous atom that has been encountered in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then, a. if the previous atom was a space, breaking the line at the end of the curent atom, otherwise, b. breaking the line at the end of the last token on the line that was followed by a space, if said total width is not sufficient to fill the line, proceeding to the next token, and then deleting the atom comprising the steps of, deleting the token associated with the atom, and deleting the data block associated with the deleted token if there are no further references to the data block to determine the token for the new atom, (c) deleting the token corresponding to the special data block, (d) substituting the reference to the token determined in (a)

(e) inserting a second token corresponding to a data block created from the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said said atom bit map into a line buffer to create a line bit map for raster imaging, and proceeding to the next atom for the character if it is a space or punctuation mark, (f) processing the next character by the following method of determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise b. breaking the current line at the end of the last token on the line that was followed by a space, and if said total width is not sufficient to fill the current line, proceeding to the next token, and then adding a character to an atom in a line of text comprising the steps of:

deleting the token associated with the atom to be changed, substituting therefor (1) a first token and a data block for the fragment of the atom preceeding the inserted character, (2) a second token corresponding to (a) a data block created from the following method if the character is a space or punctuation mark, determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom or (b) special data block if the character is a letter or number, and (3) a third token and data block for the fragment of the atom after the inserted character, and beginning with the first token on the current line, breaking the current line in accordance with line breaking steps, and beginning with the first token on the current line, breaking the current line in accordance with the line breaking steps.

10. A method of encoding text comprising a string of atoms, said string of atoms comprising words, numerals, punctuation marks and spaces, into a list of tokens and a corresponding array of data blocks and using each successive token in the token list to determine a line break point comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next current atom, adding the width of the current atom to said data block so that said data block can be used to determine where the current line can be broken, using the current token to access the corresponding data block, adding the width of the current atom in the data block to a running sum of atom widths on the current line to determine the total width of all atoms on the current line, if the sum of widths is not sufficient to fill the current line, proceeding to the next token, if the sum of widths is sufficient to fill the current line, breaking the current line at the end of the current atom and proceeding to the next line, if the the sum of widths is too great to fit on the current line, dividing the current word at a hyphenation point, adding the beginning of the hyphenated word to the end of the current line, and starting the next line with the ending portion of the current word, and then adding a character to an atom in a line of text thus formed by:

deleting the token associated with the atom to be changed, substituting therefor
(1) a first token and a data block for the fragment of the atom preceeding the inserted character,
(2) a second token corresponding to
   (a) a data block created from the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:
determining whether the current atom in said string is identical to a previous atom that has been encountered earlier in said string;
if so, adding the token of said previous atom to said list of tokens, and proceeding to the storing step,
if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and
for each current atom, storing said said atom bit map into a line buffer to create a line bit map for raster imaging, and proceeding to the next atom if the character is a space or punctuation mark, or
   (b) special data block if the character is a letter or number,
(3) a third token and data block for the fragment of the atom after the inserted character, and
beginning with the first token on the line, breaking the current line in accordance with the method of,
determining whether the current atom in said string is identical to a previous atom that has been encountered earlier in said string,
if so, adding the token of said previous atom to said list of tokens, and proceeding to the next atom,
if not, adding a new and unique token to said list of tokens, creating a new data block corresponding to said new token comprising the string of characters in said current atom, and proceeding to the next atom,
adding the width of the current atom to said data block so that said data block can be used to determine where the current line can be broken,
for each data block that contains a word, adding the hyphenation points of said word and the widths of each partial word thus produced by said hyphenation points to said data block
using the current token to access the corresponding data block,
adding the width of the current atom in the data block to a running sum of atom widths on the current line to determine the total width of all atoms on the current line, if the sum of widths is not sufficient to fill the current line, proceeding to the next token,
if the sum of widths is sufficient to fill the line, breaking the line at the end of the current atom and proceeding to the next line,
if the sum of widths is too great to fit on the current line, dividing the current word at a hyphenation point, adding the beginning of the hyphenated word to the end of the current line, and starting the next line with the ending portion of the current word, and then performing the method of deleting an atom comprising the steps of:
deleting the token associated with the atom,
deleting the data block associated with the deleted token if there are no further references to the data block, and
repeating the line breaking steps,
   wherein two atoms are defined as identical when they have the same characters, style, size, weight, stress and capitalization
   wherein two atoms are defined as identical when they have the same characters, style, size, weight, stress and capitalization.

11. The method of adding a character to an atom in a line of text formed by the method of breaking lines of text comprising a string of atoms, said string of atoms comprising words, numerals, punctuation marks and spaces, into a list of tokens and a corresponding array of data blocks, and then deleting an atom therefore, comprising the steps of
determining whether the current atom in said string is identical to a previous atom that has been encountered earlier in said string,
a. if so, adding the token of said previous atom to said list of tokens, and proceeding to the next atom,
b. if not, adding a new and unique token to said list of tokens, creating a new data block corresponding to said new token comprising the string of characters in said current atom, and proceeding to the next atom,
adding the width of the current atom to said data block so that said data block can be used to determine where the current line can be broken,
using the current token to access the corresponding data block,
adding the width of the current atom in the data block to a running sum of widths on the current line to determine the total width of all atoms on the current line, and
if said total width is sufficient to fill the line, then
a. if the previous atom was a space, breaking the line at the end of the current atom, otherwise,
b. breaking the line at the end of the last token on the line that was followed by a space,
if said total width is not sufficient to fill the line, proceeding to the next token, and then deleting the atom comprising the steps of:
deleting the token associated with the atom, and
deleting the data block associated with the deleted token if there are no further references to the data block,
deleting the token associated with the atom to be changed, substituting therefor
   (1) a first token and a data block for the fragment of the atom preceeding the inserted character,
   (2) a second token corresponding to
      (a) a data block created from the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said said atom bit map into a line buffer to create a line bit map for raster imaging, and proceeding to the next atom if the character is a space or punctuation mark, or (b) a special data block if the character is a letter or number, and (3) a third token and data block for the fragment of the atom after the inserted character, and beginning with the first token on the current line, breaking the current line in accordance with the method of breaking lines of text comprising a string of atoms, said string of atoms comprising words, numerals, punctuation marks and spaces, into a list of tokens and a corresponding array of data blocks, and then deleting an atom therefore, comprising the steps of determining whether the current atom in said string is identical to a previous atom that has been encountered earlier in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block.

12. A method of breaking lines of text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise, b. breaking the current line at the end of the last token on the current line that was followed by a space, and if said total width is not sufficient to fill the current line, proceeding to the next token, and then identifying the character in a line thus formed by identified by a cursor, comprising the steps of:

determining which line the cursor appears in, starting from the left end of the current line, adding the width of the current atom to a running sum of widths of atoms in the current line until the width of the running sum exceeds the distance of the cursor form the left end of the current line, and proceeding one character at a time to the left until the width of the running sum equals the distance of the cursor from the left end of the current line.

13. A method of encoding text comprising a string of atoms, said string of atoms comprising words, numerals, punctuation marks and spaces, into a list of tokens and a corresponding array of data blocks and using each successive token in the token list to determine a line break point comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of atom widths on the current line to determine the total width of all atoms on the current line, if the sum of widths is not sufficient to fill the current line, proceeding to the next token, if the sum of widths is sufficient to fill the current line, breaking the current line at the end of the current atom and proceeding to the next line, if the sum of widths is too great to fit on the current line, dividing the current word at a hyphenation point, adding the beginning of the hyphenated word to the end of the current line, and starting the next line with the ending portion of the current word, and identifying the character in a line thus formed at the point identified by a cursor, comprising the steps of:

starting from the left end of the current line, adding the width of the current atom to a running sum of widths of atoms in the current line until the width of the running sum exceeds the distance of the cursor form the left end of the current line, and proceeding one character at a time to the left until the width of the running sum equals the distance of the cursor from the left end of the current line, wherein two atoms are defined as identical when they have the same characters, style, size, weight, stress and capitalization.

14. A method of breaking lines of text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new taken comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the current line, then, a. if the previous token was a space, breaking the current line at the end of the current atom, otherwise b. breaking the current line at the end of the last token on the line that was followed by a space, and if said total width is not sufficient to fill the current line, proceeding to the next token, and then adding a character to an atom in a line of text comprising the steps of:

deleting the token associated with the atom to be changed, substituting therefor
  (1) a first token and a data block for the fragment of the atom preceeding the inserted character,
  (2) a second token corresponding to
    (a) a data block created from the following method if the character is a space or punctuation mark, determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom or
    (b) special data block if the character is a letter or number, and
  (3) a third token and data block for the fragment of the atom after the inserted character, and beginning with the first token on the current line, breaking the current line in accordance with line breaking steps and then identifying the character in a line formed by the above method that is at the point identified by a cursor, comprising the steps of:

starting from the left end of the current line, adding the width of the current atom to a running sum of widths of atoms in the current line until the width of the running sum exceeds the distance of the cursor from the left end of the current line, and proceeding one character at a time to the left until the width of the running sum equals the distance of the cursor from the left end of the current line.

15. A method of encoding text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, then searching for an atom in text thus encoded and replacing it with one or more atoms comprising the steps of:
  (1) using the encoding steps to determine the token sequence representing the atoms to be searched for, (2) beginning with the current atom in the text, determining if it is equal to the first atom in the encoded search string, if not proceed to the next token in the text, otherwise continue with (3), (3) for each succeeding token in the encoded search string, comparing each succeeding token in the text; if one of the tokens does not match, then return to (2) and continue with the first token after the last token processed in step (2), (4) determining the encoding for the replacement tokens, and (5) replacing the encoded search string located in step (3) with the tokens derived from step (4)

16. A method of encoding text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, and adding the width of the current atom to said data block so that said data block can be used to determine where the current line can be broken, and for each data block that contains a word, adding the hyphenation points of said word and the widths of each partial word thus produced by said hyphenation points to said data block, then searching for one or more atoms in text thus encoded and replacing it with one or more atoms comprising the steps of:

(1) using the encoding method to determine the token sequence representing the atoms to be searched for, (2) beginning with the current atom in the text, determining if it is equal to the first atom in the encoded search string, if not proceed to the next token in the text, otherwise continue with (3), (3) for each succeeding token in the encoded search string, comparing each succeeding token in the text; if one of the tokens does not match, then return to (2) and continue with the first token after the last token processed in step (2), (4) determining the encoding for the replacement tokens, and (5) replacing the encoded search string located in step (3) with the tokens derived from step (4).

17. A method of breaking lines of text comprising a string of atoms, said string of atoms comprising words, numerals, punctuation marks and spaces, into a list of tokens and a corresponding array of data blocks, and then deleting an atom therefore, comprising the steps of determining whether the current atom in said string is identical to a previous atom that has been encountered earlier in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block and searching for one or more atoms in text encoded by the above method and replacing it with one or more atoms comprising the steps of (1) using the method of breaking lines of text comprising a string of atoms, said string of atoms comprising words, numerals, punctuation marks and spaces, into a list of tokens and a corresponding array of data blocks, and then deleting an atom therefore, comprising the steps of determining whether the current atom in said string is identical to a previous atom that has been encountered earlier in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block to determine the token sequence representing the atoms to be searched for, (2) beginning with the current atom in the text, determining if it is equal to the first atom in the encoded search string; if not, proceed to the next token in the text, otherwise continue with (3), (3) for each succeeding token in the encoded search string, comparing each succeeding token in the text; if one of the tokens does not match, then return to (2) and continue with the first token after the last token processed in step (2), (4) determining the encoding for the replacement tokens, and (5) replacing the encoded search string located in step (3) with the tokens derived from step (4).

18. A method of encoding text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, and adding the width of the current atom to said data block so that said data block can be used to determine where the current line can be broken, and then checking the spelling of the words in text thus encoded by the step of:

for each token that is preceded and followed by a space or punctuation mark, checking the spelling of the string in each data block.

19. A method of encoding text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, and adding the width of the current atom to said data block so that said data block can be used to determine where the current line can be broken, and for each data block that contains a word, adding the hyphenation points of said word and the widths of each partial word thus produced by said hyphenation points to said data block, then checking the spelling of the words in text thus encoded by performing the step of:

for each token that is preceded and followed by a space or punctuation mark, checking the spelling of the string in each data block.

20. The method of checking the spelling of the words in text encoded by the method of breaking lines of text comprising a string of atoms, said atoms having bit maps, said string comprising a current atom, previous atoms and next atoms, each atom having a width, said string of atoms comprising words comprising strings of characters, hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom comprising the step of for each token that is preceeded and followed by a space or punctuation mark, checking the spelling of the string in each data block.

21. The method of claim 18 further comprising the step of scanning the text for contiguous tokens that are not separated by a space or punctuation mark, and spell checking any word thus created.

22. The method of claim 19 further comprising the step of scanning the text for contiguous tokens that are not separated by a space or punctuation mark, and spell checking any word thus created.

23. The method of checking the spelling of the words in text encoded by the method of breaking lines of text comprising a string of atoms, said atoms having bit maps, said string comprising a current atom, previous atoms and next atoms, each atom having a width, said string of atoms comprising words comprising strings of characters. hyphenation points, and the widths of the partial words thus produced, numerals, punctuation marks and spaces, into a current line comprising a list of tokens and a corresponding array of data blocks comprising the steps of:

determining whether the current atom in said string is identical to a previous atom that has been encountered earlier in said string;

if so, adding the token of said previous atom to said list of tokens, and proceeding to the storing step, if not, adding a new and unique token to said list of tokens, creating a new data block corresponding to said new token comprising the characters in said current atom, adding the width of the current atom to said data block so that said data block can be used to determine where the current line can be broken, for each data block that contains a word, adding the hyphenation points of said word and the widths of each partial word thus produced by said hyphenation points to said data block, and adding an atom bit map to said data block during said creating step, and for each current atom, storing said atom bit map into a line buffer to create a line bit map for raster imaging, and proceeding to the next atom comprising the step of for each token that is preceeded and followed by a space or punctuation mark, checking the spelling of the string in each data block
further comprising the step of
scanning the text for contiguous tokens that are not separated by a space or punctuation mark, and spell checking any word thus created.

24. A method of encoding text comprising a string of atoms, said string of atoms comprising words, numerals, punctuation marks and spaces, into a list of tokens and a corresponding array of data blocks comprising the steps of:

determining whether the current atom in said string is identical to a previous atom that has been encountered earlier in said string, if so, adding the token of said previous atom to said list of tokens, and proceeding to the next atom, if not, adding a new and unique token to said list of tokens, creating a new data block corresponding to said new token comprising the string of characters in said current atom, and proceeding to the next atom, and adding the width of the current atom to said data block so that said data block can be used to determine where the current line can be broken, and for each data block that contains a word, adding the hyphenation points of said word and the widths of each partial word thus produced by said hyphenation points to said data block, then compacting text that has been thus encoded comprising the steps of:

creating a new table with an entry for each data-block stored in memory, including in each element of the new table the characters, break-point locations, and size of the original datablock;

adding to the new table the address in memory of each datablock created in the encoding steps.

25. The method of compacting text that has been encoded with the method of breaking lines of text comprising a string of atoms, said string of atoms comprising words, numerals, punctuation marks and spaces, into a list of tokens and a corresponding array of data blocks, and then deleting an atom therefore, comprising the steps of determining whether the current atom in said string is identical to a previous atom that has been encountered earlier in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block for storage comprising the steps of:

creating a new table with an entry for each data-block stored in memory, including in each element of the new table the characters, breakpoint locations, size of the bitmap, and size of the original datablock, and adding to the new table the address in memory of each data-block created by the method of breaking lines of text comprising a string of atoms, said string of atoms comprising words, numerals, punctuation marks and spaces, into a list of tokens and a corresponding array of data blocks, and then deleting an atom therefore, comprising the steps of determining whether the current atom in said string is identical to a previous atom that has been encountered earlier in said string, a. if so, adding the token of said previous atom to said list of tokens, and proceeding to the next atom, b. if not, adding a new and unique token to said list of tokens, creating a new data block corresponding to said new token comprising the string of characters in said current atom, and proceeding to the next atom, adding the width of the current atom to said data block so that said data block can be used to determine where the current line can be broken, using the current token to access the corresponding data block, adding the width of the current atom in the data block to a running sum of widths on the current line to determine the total width of all atoms on the current line, and if said total width is sufficient to fill the line, then a. if the previous atom was a space, breaking the line at the end of the current atom, otherwise, b. breaking the line at the end of the last token on the line that was followed by a space, if said total width is not sufficient to fill the line, proceeding to the next token, and then deleting the atom comprising the steps of:

deleting the token associated with the atom, and deleting the data block associated with the deleted token if there are no further references to the data block.

* * * * *